US006852266B2

(12) United States Patent
Robinson et al.

(10) Patent No.: US 6,852,266 B2
(45) Date of Patent: Feb. 8, 2005

(54) ULTRASONIC ASSISTED DEPOSITION OF ANTI-STICK FILMS ON METAL OXIDES

(75) Inventors: Timothy R. Robinson, Lake Forest Park, WA (US); Leonard Y. Nelson, Seattle, WA (US)

(73) Assignee: Korry Electronics Co., Seattle, WA (US)

( * ) Notice: Subject to any disclaimer, the term of this patent is extended or adjusted under 35 U.S.C. 154(b) by 433 days.

(21) Appl. No.: 09/930,111

(22) Filed: Aug. 14, 2001

(65) Prior Publication Data

US 2002/0130441 A1 Sep. 19, 2002

Related U.S. Application Data

(63) Continuation-in-part of application No. 09/785,667, filed on Feb. 16, 2001, which is a continuation-in-part of application No. 09/769,014, filed on Jan. 19, 2001.

(51) Int. Cl.$^7$ .............................. B06B 1/00; B05D 1/18
(52) U.S. Cl. ...................... 264/442; 264/338; 264/446; 427/434.5
(58) Field of Search ................................ 264/442, 338, 264/446; 425/174.2; 427/434.5, 430.1, 435

(56) References Cited

U.S. PATENT DOCUMENTS

| 3,126,294 A | 3/1964 | Pichler |
| 3,506,556 A | 4/1970 | Gillery et al. |
| 3,629,388 A | 12/1971 | Wolf et al. |
| 3,808,077 A | 4/1974 | Rieser et al. |
| 3,925,530 A | 12/1975 | Rees |
| 3,931,381 A | 1/1976 | Lindberg |
| 3,993,620 A | 11/1976 | Yamanishi et al. |
| 4,102,954 A | 7/1978 | Coale |
| 4,118,235 A | 10/1978 | Horiuchi et al. |
| 4,131,662 A | 12/1978 | Cekoric et al. |
| 4,183,843 A | 1/1980 | Koenig |
| 4,230,758 A | 10/1980 | Nagai et al. |
| 4,263,350 A | 4/1981 | Valimont |
| 4,518,031 A | 5/1985 | Yamanishi et al. |
| 4,671,838 A | 6/1987 | Bravet et al. |
| 4,775,554 A | 10/1988 | Ponjee |
| 4,791,185 A | 12/1988 | Kanemura et al. |
| 4,887,791 A | 12/1989 | Tangari et al. |

(List continued on next page.)

OTHER PUBLICATIONS

Bolger, J.C., and S. Michaels, "Molecular Structure and Electrostatic Instructions at Polymer–Solid Interfaces," in P. Weiss and G.D. Cheever (eds.), *Interface Conversion for Polymer Coatings*, Elsevier, New York, 1969, pp. 4–59.

(List continued on next page.)

*Primary Examiner*—Melvin C. Mayes
*Assistant Examiner*—Yewebdar Tadesse
(74) *Attorney, Agent, or Firm*—Christensen O'Connor Johnson Kindness PLLC

(57) ABSTRACT

A method and apparatus for ultrasonic assisted deposition of a release agent onto a workpiece is disclosed. The release agent can be any fluorinated or non-fluorinated phosphorous-containing organic acid. The workpiece can be any workpiece desired to be coated with the release agent, such as a surface needing an anti-stick coating required in a plastic casting or injection mold. Metal oxide workpiece surfaces strongly bond to fluorinated phosphorus-containing organic acids. In particular, the present invention can deposit anti-stick coatings onto smooth or porous surfaces, such as anodized aluminum and its alloys, using ultrasonic assisted deposition.

66 Claims, 9 Drawing Sheets

U.S. PATENT DOCUMENTS

| | | | |
|---|---|---|---|
| 4,983,566 A | | 1/1991 | Wieserman et al. |
| 5,039,435 A | | 8/1991 | Hanano |
| 5,071,676 A | * | 12/1991 | Jacobson ................... 427/216 |
| 5,102,507 A | | 4/1992 | Wieserman et al. |
| 5,126,209 A | | 6/1992 | Kruger |
| 5,132,181 A | | 7/1992 | Wefers et al. |
| 5,143,750 A | | 9/1992 | Yamagata et al. |
| 5,204,126 A | | 4/1993 | Singh et al. |
| 5,223,350 A | | 6/1993 | Kobayashi et al. |
| 5,277,788 A | | 1/1994 | Nitowski et al. |
| 5,277,831 A | | 1/1994 | Hanano |
| 5,531,841 A | | 7/1996 | O'Melia et al. |
| 5,614,581 A | | 3/1997 | Cobbledick et al. |
| 5,753,730 A | | 5/1998 | Nagata et al. |
| 5,776,265 A | | 7/1998 | Kramer et al. |
| 5,804,674 A | | 9/1998 | Yamana et al. |
| 5,827,567 A | | 10/1998 | Molitor |
| 5,856,853 A | * | 1/1999 | Konuma et al. ............... 349/42 |
| 5,876,801 A | | 3/1999 | Ogawa et al. |
| 5,897,918 A | | 4/1999 | Singh et al. |
| 5,962,561 A | | 10/1999 | Turshani et al. |
| 6,117,495 A | | 9/2000 | Hanson et al. |
| 6,225,205 B1 | * | 5/2001 | Kinoshita ................... 438/613 |
| 6,299,983 B1 | | 10/2001 | Van Alsten |
| 6,347,584 B1 | * | 2/2002 | Kawamoto et al. ......... 101/170 |

OTHER PUBLICATIONS

Choi, J.Y., et al., "Properties of Cadmium Sulfide Thin Films Deposited by Chemical Bath Deposition With Ultrasonication," *Solar Energy* 64(1–3):41–47, Sep. 1998.

Dezhkunov, N.V., and P.P. Prokhorenko, "Action of Ultrasound on the Rise of a Liquid in a Capillary Tube and its Dependence on the Properties of the Liquid," *Journal of Engineering Physics* 5:1014–1019, 1981.

Suslick, K.S., and G.J. Price, "Applications of Ultrasound to Materials Chemistry," *Annu. Rev. Mater. Sci.* 29:295–326, 1999.

Asher, William E., "Epoxy Replication—Advantages and Limitations," in Max J. Riedl (ed.), "Replication and Molding of Optical Components," *Proceedings of the International Society for Optical Engineering*, vol. 896, Los Angeles, Calif., Jan. 13–14, 1988, pp. 2–18.

Berg, John C. (ed.), *Wettability*, vol. 49, Surfactant Science Series, Marcel Dekker, Inc., New York, 1993, pp. 98–107.

Billmeyer, Fred W., Jr., *Textbook of Polymer Science*, 3d ed., John Wiley & Sons, New York, 1984, p. 465.

Bohling, David A., et al., "A Look at Lenses," *Vacuum & Thinfilm*, Nov./Dec. 1998, pp. 22–28.

"Cast Resin Department," *Fosta–Tek Optics: Engineered Optical Plastics*, n.d., <http://www.fostatek.thomasregister.com/olc/fostatek/cast.htm> (Oct. 31, 2000).

Hicks, Clark T., "Casting of Film," in Modern Plastics (ed.), *Plastics Handbook*, McGraw Hill, 1994, pp. 147–148.

Nightshield® Night–Vision Filters brochure, Korry Electronics Co., Seattle, Wash., 1996, 4 pages.

Woods, George, *The ICI Polyurethanes Book*, 2d ed., Polyurethanes and John Wiley & Sons, New York, 1990, pp. 101–117.

Woods, George, *The ICI Polyurethanes Book*, 2d ed., Polyurethanes and John Wiley & Sons, New York, 1990, pp. 182–187.

Wu, Souheng, *Polymer Interface and Adhesion*, Marcel Dekker, Inc., New York, 1982, pp. 600–603.

* cited by examiner

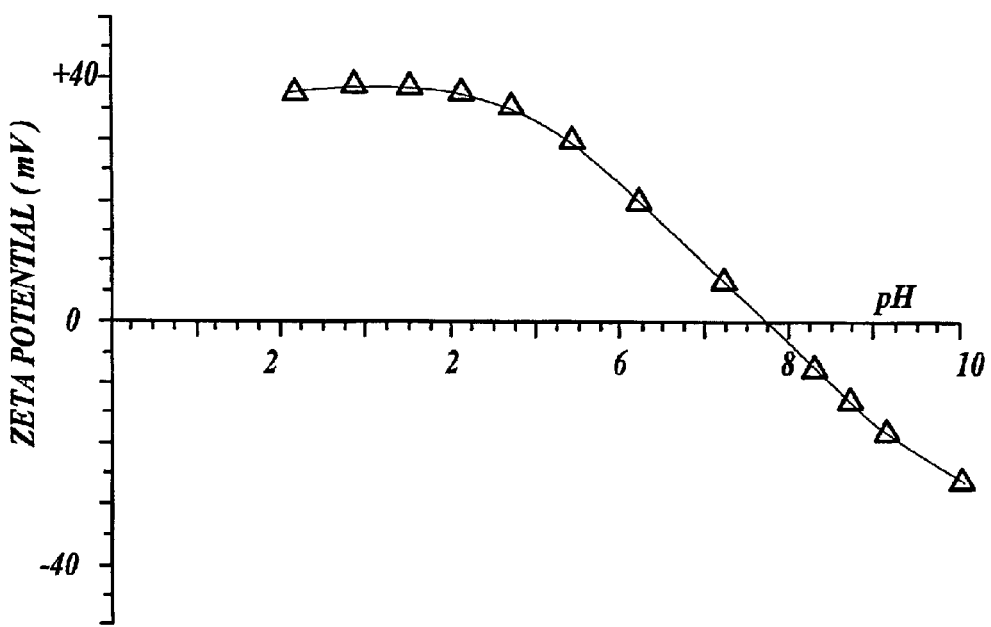
Fig.1.
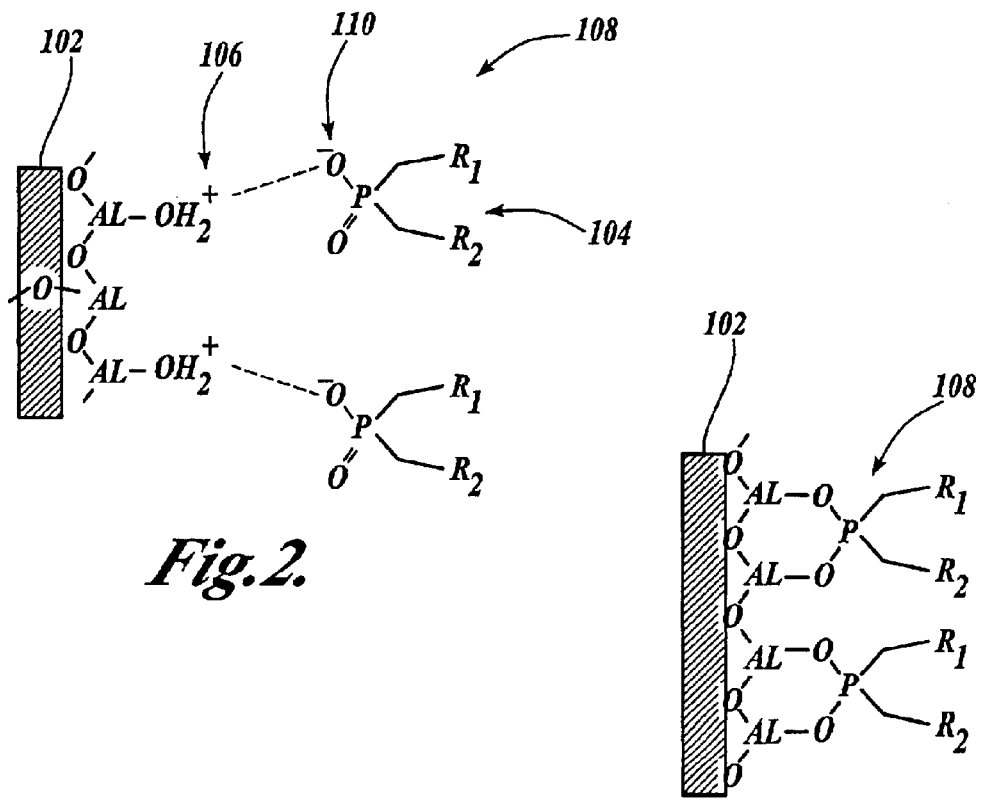
Fig.2.
Fig.3.

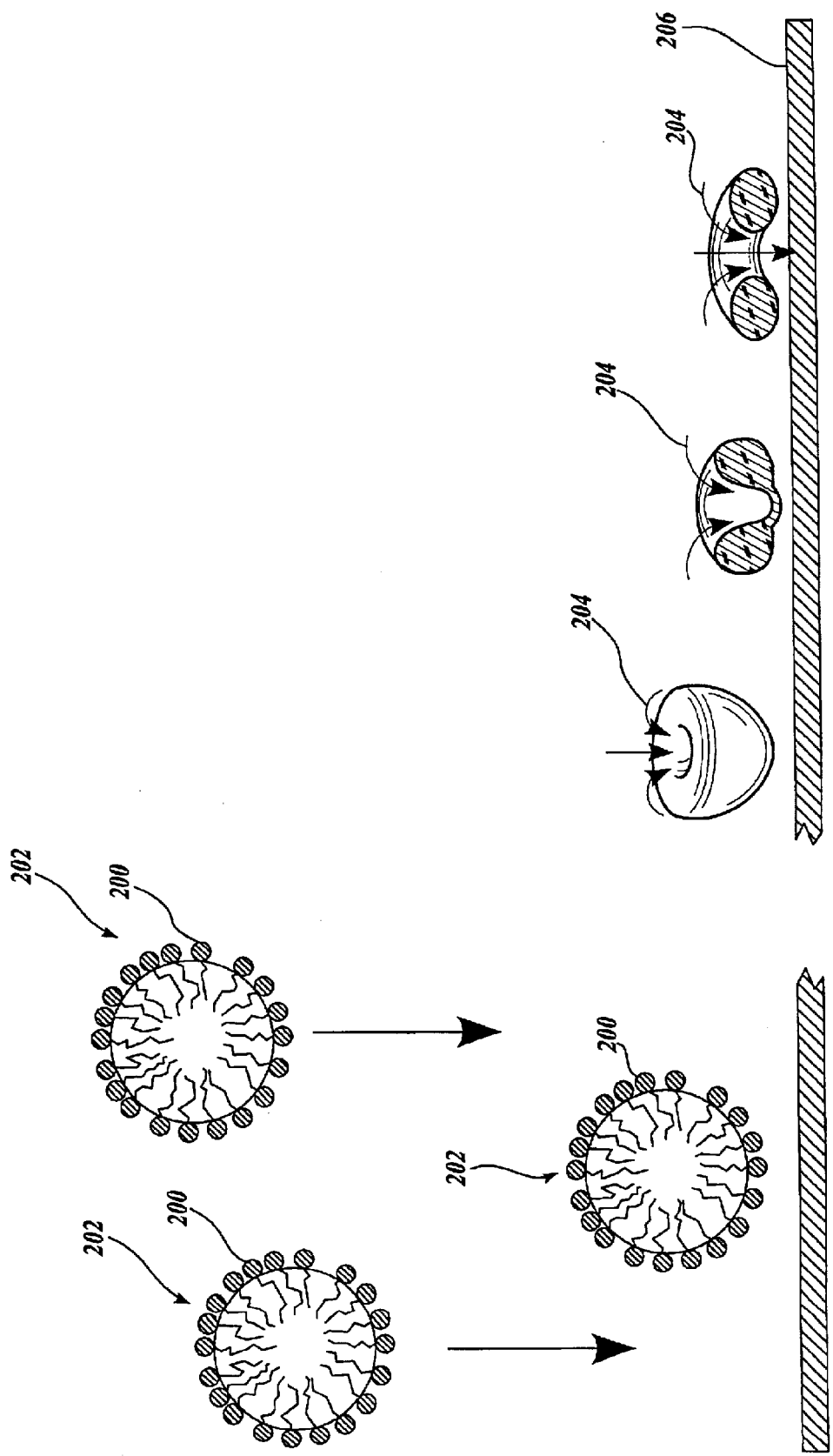

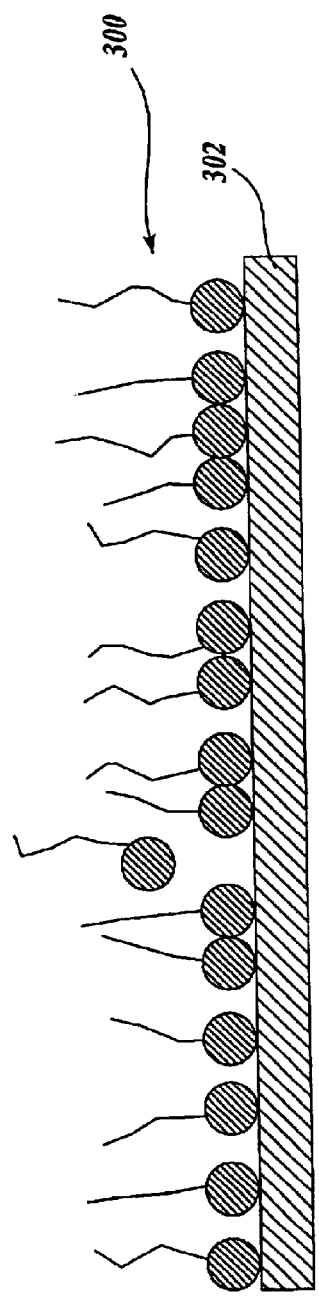
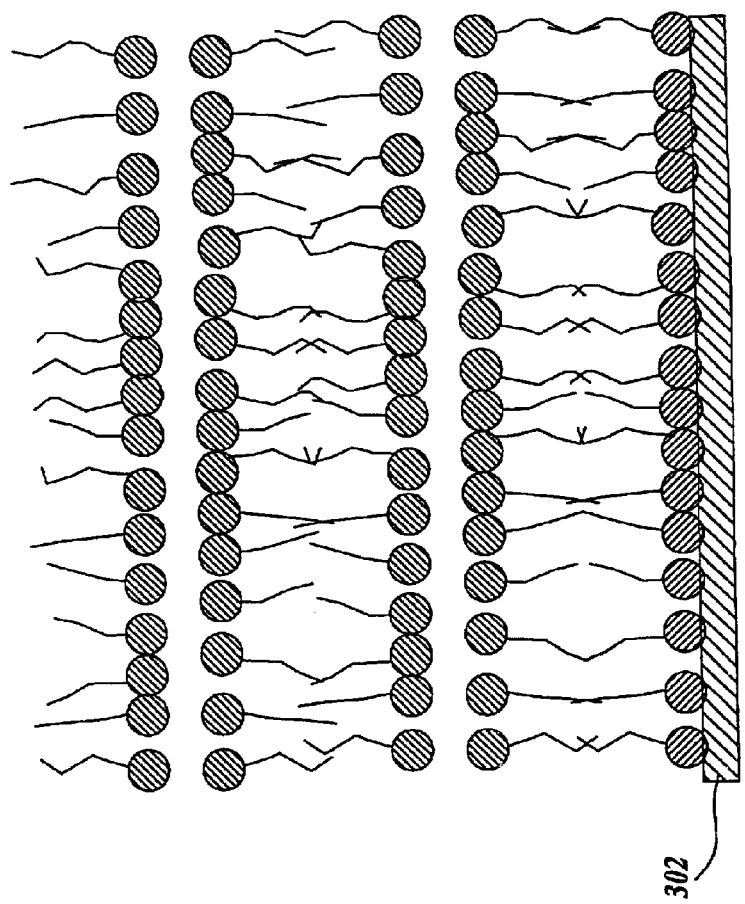
Fig. 6.
Fig. 7.

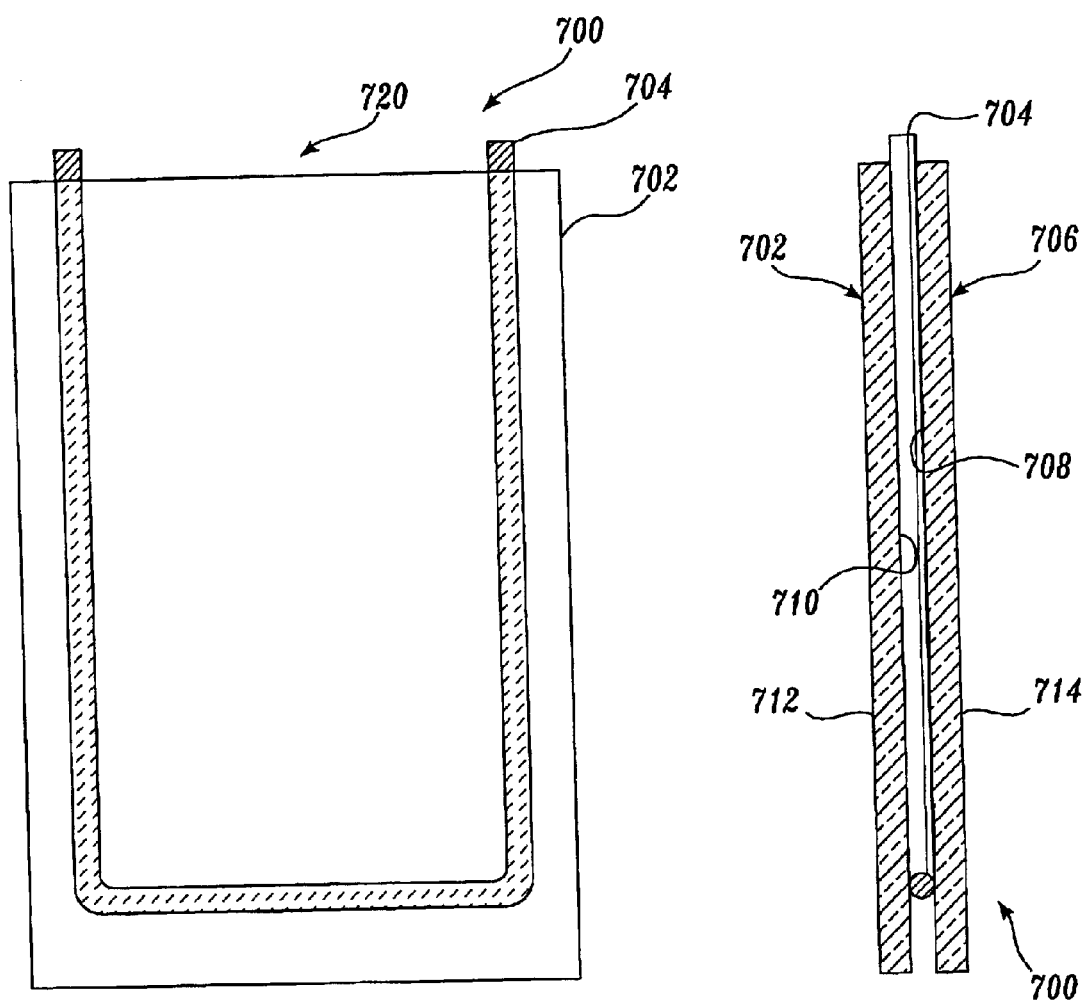
*Fig.12.*  *Fig.13.*

ULTRASONIC ASSISTED DEPOSITION OF ANTI-STICK FILMS ON METAL OXIDES

CROSS-REFERENCES TO RELATED APPLICATIONS

This application is a continuation in part of U.S. patent application Ser. No. 09/785,667, filed on Feb. 16, 2001, which in turn is a continuation in part of U.S. patent application Ser. No. 09/769,014, filed on Jan. 19, 2001, priority of which is claimed under 35 U.S.C. Section 120.

FIELD OF THE INVENTION

The present invention relates to the field of thermoset moldings and more particularly to mold releases, and anti-stick coatings for cell casting and injection molds and the moldings made therefrom.

BACKGROUND OF THE INVENTION

Precise molding and replication of surfaces using thermoset resins is a difficult procedure because the resins have a strong tendency to bond with the mold surfaces during the curing stage. Thermoset materials such as epoxies and urethanes are excellent adhesives that bond to a variety of materials ranging from metals to glass. Therefore, removal of these plastic materials from a metal or glass mold without damaging the surface finish or leaving undesirable residues on either the molding surface or finished product is a difficult problem. Release agents consisting of fluorocarbon compounds attached to the mold surfaces provide a non-reactive barrier (anti-stick) to the resin materials as well as lubricity.

Aluminum alloys are common materials used to fabricate molds for shaping plastic articles and producing laminated products such as skis and aircraft composites. These alloys are inexpensive, light-weight and readily machined to accommodate a wide range of complex shapes. However, aluminum is inherently very soft and easily scratched. Various alloying elements may increase the hardness of a metal mold. However the surface of aluminum alloys are not hard enough to prevent marring and damage resulting from handling within a typical production environment.

Oxide coatings are commonly used to increase the wear resistance of aluminum alloy surfaces. Aluminum or its alloys has an inherent aluminum oxide film resulting from normal oxidization when exposed to air. However, the native oxide is only a few molecular layers thick and is insufficient to protect the surface from wear. Aluminum oxide layers thicker than the native oxide can be grown by a well known technique called anodization. When aluminum is anodically polarized in an electrolytic solution, a hard oxide layer grows to a thickness of about 0.001 to 0.003 inches, which is sufficient to protect the surface from wear. The aluminum is said to be once-anodized.

Although anodization can protect the mold surface from wear in a normal production environment, anodization also renders the mold surface more chemically active to resins used to fabricate plastic articles. Furthermore, the anodized aluminum mold surfaces are complex structures populated with highly porous cavities. Pore sizes can range from 10 to 350 Angstroms depending on anodization parameters. The small and chemically active cavities provide an attachment point for organic resins used in the molding process. In addition, pores offer pockets for trapped air. The trapped air can be difficult to displace while applying mold release. Therefore, although a mold release material may be applied on the surface, regions of the chemically active anodized surface are protected by the trapped air, and may become an adhesion site for the resin during the cure cycle. A low viscosity liquid resin will enter the pores and harden during the curing cycle and become chemically and mechanically interlocked into the anodized surface. Hence difficulties arise in separating the molded part from the anodized mold surface.

Sealing is an industrial process applied to anodized aluminum that reduces the porosity upon exposure to steam or hot water or solutions of nickel acetate. During the sealing process, the pore wall material reacts with water to form a gelatinous aluminum hydroxide structure called boehmite. As the reaction proceeds, the gelatinous aluminum hydroxide begins to fill the pore volume. While the sealing process reduces surface porosity, it does not eliminate the pores. Furthermore, sealing does not reduce the enhanced chemical activity brought about by the anodization process. Also, the pores are partially filled during the sealing process with a weak, gelatinous structure that can be damaged and depleted if adhered to the cast resin material. For a review of anodization and sealing, reference is made to "The Technology of Anodized Aluminum," 3rd Edition, by Arthur Brace, and "Oxides and Hydroxides of Aluminum" by Karl Wefers and Chanakya Misra, *Alcoa Laboratories,* Publication 19 (1987), both of which are herein expressly incorporated by reference.

One approach to overcoming release problems is through the use of release agents applied to the internal mold surfaces. Various release materials can be applied to an anodized aluminum mold surface to facilitate separation of the cured polymer resins. Silicone oils are quite commonly used, but they leave a residue on the molded plastic and mold. Oily contaminants present post-processing adhesion problems for the molded part if paint or any other coating must be applied. The residual oil left on the mold may also diminish the surface quality of subsequent molded parts. Suitable fluorine-containing mold releases described in U.S. Pat. No. 4,230,758 to Nagai et al., which is herein expressly incorporated by reference, have been deposited on aluminum surfaces using high temperatures (>350° C.) to embed fluorocarbon resins into the aluminum surface.

Others have applied special surface pre-treatments to enhance the adhesion of the fluoropolymer coating to aluminum oxide surfaces. U.S. Pat. No. 5,531,841 to O'Meilia et al., which is herein expressly incorporated by reference, applies a chromate conversion coating to the aluminum prior to treating the surface at high temperatures (550° F. to 850° F.) with the fluorocarbon material. Both of these treatments are costly, necessitate additional time and processing steps, and in the latter case involves environmentally sensitive chromate processing. U.S. Pat. No. 5,897,918, to Singh, which is herein expressly incorporated by reference, describes a mold release coating for glass that is purported to enter porous surfaces. However, it is not suitable for anodized aluminum surfaces due to the nature of the chemical attachment mechanism that depends on a silanol condensation reaction. For metal surfaces, Singh describes the use of a thiol, carboxylic acid and salts thereof, amine, nitrate, cyanide or sulfonate reactive group. Therefore, it is desirable to produce methods and apparatus for depositing durable coatings and release agents onto any suitable workpiece, in particular molds having metal oxide features and more particularly anodized aluminum.

Glass surfaces are often used in molding optical products such as lenses, windows and filters using thermosetting resins, e.g., epoxy and urethane. Analogous to metals, a glass surface is populated by a high density of silicon oxides and hydroxides. These moieties bond quite strongly to thermosetting resins such as epoxy and urethane. Hence, a durable release coating for a glass mold is needed to prevent adhesion of the thermosetting resins to the glass mold surfaces. Singh et al. (U.S. Pat. No. 5,204,126) describe silicon based materials that are suitable for glass mold surfaces.

BRIEF SUMMARY OF THE INVENTION

The present invention includes a method for depositing a release agent on a surface of a workpiece. The method includes the following steps: providing a workpiece having a desired feature to be coated with the release agent; providing a solution having a suitable mold release agent and water, so that the workpiece can be placed within the solution; and providing ultrasonic energy to the solution, so that the energy is directed at the workpiece at a suitable power level and for a suitable time to provide the feature with a film containing the release agent.

In one embodiment the workpiece includes a metal oxide, wherein the metal is aluminum or an aluminum alloy.

In another embodiment of the invention, the solution includes a release agent that is an anionic compound. The anionic compound can be fluorinated and includes compounds that are either esters or acids of phosphates, phosphonates, phosphonites, sulfates, sulfites, and carboxylates. The compound can be fluorinated or non-fluorinated.

In another aspect of the invention, a method for making a thermoset molded body is provided. The method includes the following steps: providing a workpiece having an ultrasonically applied release agent at the mold feature; providing a suitable thermoset resin in contact with the mold feature; curing the resin to form a molded body and separating the molded body from the workpiece.

In one embodiment of the invention, the resin mixture includes either an epoxy or an isocyanate urethane precursor or any combination thereof.

In another aspect of the invention, a system for making molded bodies is provided. The system includes a once-anodized aluminum workpiece; a solution having a suitable release agent so that the workpiece can be placed in the solution; and an ultrasonic tool placed in a suitable relationship to the workpiece to deliver ultrasonic energy to the workpiece when it is placed in the solution.

The present invention provides numerous advantages. The present invention provides a thin, dense, and durable mold release coating onto a metal oxide containing workpiece, such as any anodized aluminum mold, machined aluminum mold, or other suitable surface, without leaving an oily residue or requiring costly or environmentally unfriendly surface preparations. The present invention provides a chemically resistant and non-reactive fluorocarbon coating, or other suitable release agent, at relatively low temperatures. Yet another advantage of the present invention is that it can inhibit entry and/or adhesion of a polymer molding material into the pores of a porous mold feature, such as anodized aluminum or machined aluminum surfaces.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 1 shows a graphical illustration of the Zeta potential for alumina;

FIGS. 2–3 show a schematic illustration of a proposed mechanism for phosphonic acid deposition on a workpiece according to the present invention;

FIG. 4 shows a schematic illustration of a proposed release agent transport mechanism according to the present invention;

FIG. 5 shows a schematic illustration of a proposed mechanism of ultrasonic assisted deposition according to the present invention;

FIG. 6 shows a schematic illustration of proposed chemisorption between a workpiece and an ionic release agent according to the present invention;

FIG. 7 shows a schematic illustration of proposed physisorption of ionic release agents occurring at a workpiece surface according to the present invention;

FIGS. 12–13 show a schematic illustration of one embodiment of a cell casting mold made according to the present invention;

DETAILED DESCRIPTION OF THE PREFERRED EMBODIMENT

Figure 8:
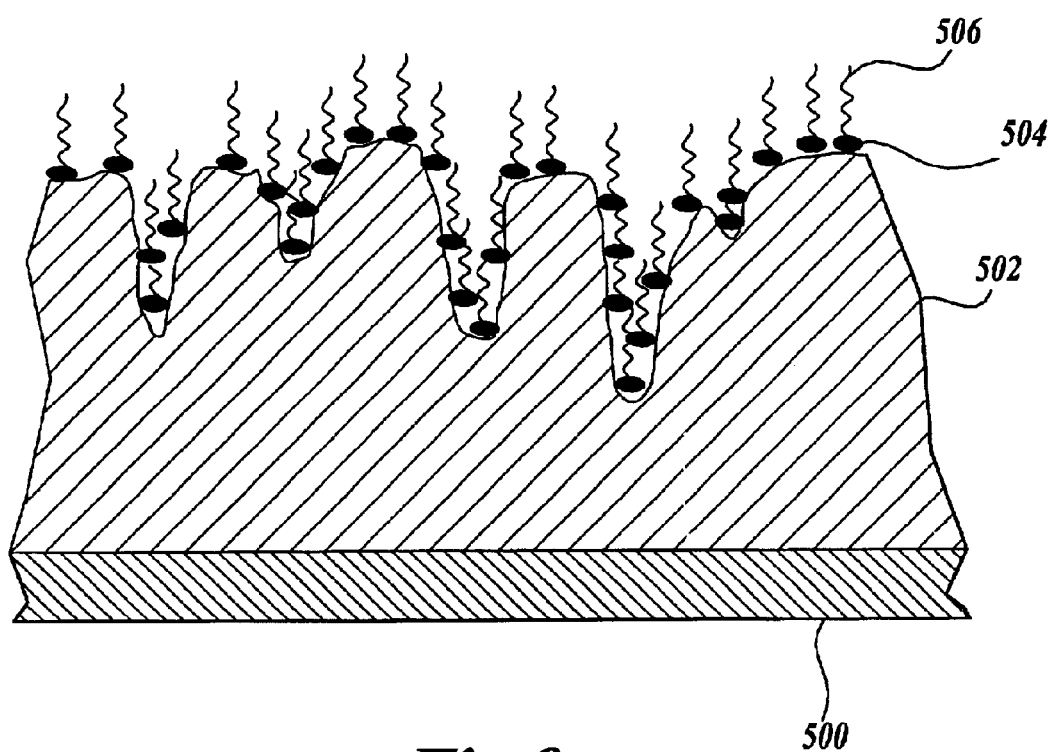
FIG. 8 shows a schematic illustration of an ultrasonically applied release agent on a porous workpiece surface according to the present invention.

Prior to undertaking a description of the present invention, certain terms are appropriately used herein to mean the following.

A "workpiece" is defined to mean any object upon which the present invention acts on, such as a mold, or any object suitable for treatment by the present invention. By way of non-limiting example, a workpiece can be a substrate, wherein the molded features are formed from the substrate, or the molded features can be distinct from the underlying substrate, meaning that the mold features are otherwise attached to an underlying substrate. In this case, the substrate and the mold features suitably form a composite structure, a workpiece, which then undergoes treatment according to the invention.

A "metal oxide" is any oxygen-containing metal compound, or any combination thereof. Without limitation, the metal oxide can include any derivative thereof, such as, but not limited to its hydroxylated structure, wherein said structure may undergo further chemistry as described herein.

A "release agent" is any compound or derivative thereof having known anti-stick, or non-stick properties with respect to highly adhesive resins. Release agents may be ionic entities in solutions or appear as films and coatings once applied on a workpiece.

The term "porous" is defined to mean certain "hollows" or imperfections in surfaces of workpieces or on any features in a workpiece that may not be visible to the unaided human eye. A non-limiting example of a porous feature is present on an anodized aluminum surface, or an unpolished machined aluminum surface.

In U.S. patent application Ser. No. 09/785,667, to Robinson et al. (hereinafter the '667 application), which is expressly herein incorporated by reference, the inventors describe a way of using internal mold release (IMR) materials within resins cast against alumina coated surfaces. The IMR described in the '667 application, an anionic phosphate surfactant, is attracted to the reactive mold surface preferentially over the resin by an electrostatic potential established between the ionized anionic surfactant and the positively charged mold surface. However, the methods described in the '667 application can be further enhanced according to the present invention herein described.

Without intending to be bound by any theory, it is thought that porous structures of the mold surface provide a chemically reactive site for the resin to adhere. Porous structures also entrap hard to displace air on the surface. If the entrapped air is not displaced during the application of the mold release, then chemically reactive sites within the pores will be available to the resin and the casting will adhere to the mold surface.

As disclosed by the '667 application, the derivatives of phosphonic acids and esters are suitable mold release agents when used in combination with certain metal oxide coated workpieces, such as aluminum. Without intending to be bound by the theory set forth herein, the present invention theorizes that anodized aluminum will form hydroxyl groups at the surface. These surface hydroxyl groups can assume an electric charge either by ionization or ion absorption upon exposure to a polar solution. The potential difference between the charged surface of a metal or its oxide and the polar solution in equilibrium with it is called the Zeta Potential. A non-limiting example of a Zeta Potential curve for alumina ($Al_2O_3$) is shown in FIG. 1. As shown in FIG. 1, the Zeta Potential decreases with increasing pH and has a "0" value at a specified pH. The pH at which the curve has "0" potential is known as its isoelectric point or "IEP". A positively charged aluminum workpiece will attract and bond to negatively charged anionic phosphonic acid compounds. As described in the '667 application, these compounds provide enhanced release characteristics when used in conjunction with molds having metal oxide surfaces. As illustrated in FIG. 1, a positive charge on the alumina surface results when exposed to solutions having a pH less than about 8. Therefore, in acidic and even mildly basic solutions, the surface of the anodized aluminum will be positively charged. This surface thus provides suitable bonding sites for any release agent capable of forming an anionic charge.

Positively charged metal oxide surfaces are generated when exposed to acidic (low pH) solutions. The positively charged surface is important to the spontaneous formation of anionic mold release films. In contrast, metal oxide surfaces exhibit a negative charge when exposed to basic solutions. For each metal oxide, there is a pH value for which there is an equal tendency to form negatively charged structures and positively charged structures (resulting in a net zero surface charge). At pH values less than the IEP, the metal oxide surface exhibits a net positive charge. A negative surface charge results when the metal oxide is exposed to an aqueous solution of a pH value greater than the IEP. An anionic release film will form spontaneously when deposited onto a metal oxide with an IEP greater than the pH of the solution containing the anionic mold release material. It is the tendency of metals to form hydroxyl groups at the surface that presents problems for metal molds that are used for shaping certain molded bodies. For example, in the polymerization reaction of an isocyanate and a polyol, the isocyanate can react with the hydroxyl groups on the metal oxide surface rather than the polyol. Thermosetting resins can adhere to the mold surface as a result of this reaction between the isocyanate and the hydroxyl groups. The present invention can thus be used for interposing a release agent at a metal oxide surface for any polymerizable composition, such as most thermosets, that has reactive groups with an affinity for hydroxyl groups.

FIG. 2 shows a schematic illustration of a non-limiting use for the present invention. A suitable workpiece surface 102 is prepared. A suitable workpiece surface can be made from any material which forms an ionic charge 106, such as a positive charge, under acidic conditions. A suitable workpiece can contain aluminum with an oxidized or anodized surface. A suitable release agent 108 is provided at the surface of the workpiece 102, according to a method of the present invention. A suitable release agent 108 is an agent forming a hydrophobic region 104 and a hydrophilic region 110, such as phosphonic acids and esters, that are attracted to the positively charged workpiece surface 102. The positively charged surface of the workpiece 102 is highly attractive to negatively charged anionic agents sufficiently enough to form covalent bonds between hydroxyl groups on the surface 102 and the release agent 108, as proposed in FIG. 3. Accordingly, any release agent having alkyl or fluorinated alkyl phosphonic acids will be attracted to the anodized aluminum surface upon bringing the workpiece in contact with an aqueous solution of the release agent by an ionic interaction. Only under basic (caustic) conditions will the phosphonic acid desorb from the anodized aluminum workpiece surface. Upon desorption, the phosphonic acid will no longer provide release properties and instead the resin will react and adhere to the anodized aluminum mold surface. However, most resins, such as epoxies and urethanes are not cured or processed under basic conditions. Hence, the phosphonic acid will not desorb during the polymer processing step thus, advantageously providing enhanced release properties. For a more in depth treatment of the subject concerning acid and base chemistry, reference is made to J. C. Bolger and A. S. Michaels, in *Interface Conversion*, P. Weiss and D. Cheevers (eds.), Ch. 1, Elsevier, N.Y. (1969), which is herein expressly incorporated by reference.

The method described in the '667 application provides adequate release for many alumina coated structures. However, porous surfaces that contain trapped air, such as anodized aluminum or machined aluminum surfaces, are not readily coated by simple soaking or wiping with the release agent. In order to render such surfaces suitable for casting, the trapped air must first be displaced from the surface. Following air displacement from porous sites, the anionic surfactants can deposit as a thin-film on the surface as described in '667 application.

The inventors of the present invention have discovered that although an anionic agent is attracted to metals that form positively charged groups at the surface, as applied to anodized aluminum workpieces, the diffusion rate of the phosphonic acid or ester into the small diameter pore features caused by anodization is too slow to effectively coat the surface of an anodized aluminum workpiece. Anodization is a well-known process for imparting hardness to "soft" metals such as aluminum. One method to insert phosphonic acids into high porosity anodized aluminum substrates was developed by Wefers et al. (U.S. Pat. No. 5,132,181) and Nitowski et al. (U.S. Pat. No. 5,277,788), both of which are herein expressly incorporated by reference. These patents describe the use of organo phosphonic/phosphinic acid materials to treat hydrothermally oxidized and electrolytically anodized aluminum surfaces, respectively. In the '788 patent, fluorocarbon phosphonic and phosphinic acids were applied to the anodized surface in the course of a twice-anodization process. The fluorinated materials were deposited on an anodized aluminum substrate while anodically polarizing the substrate. Nitowski et al. determined that the density and durability of the fluorinated phosphonic acid film improved when deposited with the aid of an applied voltage field. In contrast, Nitowski et al. also determined that the same fluorinated phosphonic acid material forms a poorer barrier if deposited on an anodized aluminum substrate by simple "dipping" methods. Treatment of once-anodized surfaces by an organo phosphonic/phosphinic acid was not considered useful in the '788 patent because the coatings did not withstand soaking in water for 72 hours. Presumably, the simple dipping method does not afford sufficient diffusion and deposition of the fluorinated phosphonic acid into the tightly confined pore structure of the anodized aluminum. Furthermore, the commercial applications identified in '181 and '788 were primers to enhance adhesion, de-icing of aluminum aircraft components (wings) and maintenance of surface reflectivity.

Plating companies with well established anodization processing facilities can utilize either the twice-anodization process or the method according to the present invention. However, the present invention provides a much simpler and more cost-effective mold release surface treatment process using a once-anodized aluminum surface instead of the twice-anodized coating process described in '788. The present invention uses ultrasonic assisted deposition (hereinafter "USAD") with equipment more suited to downstream application without inserting additional process complexity into a plating/anodizing operation.

Once-anodized aluminum represents a thick (about 0.001–0.005 inch thick), heavily oxidized aluminum surface. However, any metal oxide feature of any thickness can be used in the present invention. Anodized aluminum also contains pores and a relatively diverse surface structure compared to the optical surfaces described in the '667 application. However, as demonstrated by examples 6, 7 and 8 in U.S. Pat. No. 5,277,788, to Witowski et al., the inherent attraction established by the Zeta Potential between anodized aluminum and an anionic phosphonic acid solution is insufficient to drive the mold release agent inside the highly confined pore structure. Therefore, until the present invention there was a need for developing methods aimed at applying a mold release or any type of anti-stick coating or film to porous metal oxide workpieces, such as anodized aluminum and other metal surfaces.

The present invention provides a simple solution to the problem of producing dense and durable release coatings on a highly porous workpiece, such as anodized metals, particularly anodized aluminum. However, the present invention can be used on non-porous workpieces as well, and even on workpieces that have uneven or irregular surfaces, such as many molds. The present invention uses the inherent Zeta Potential established between the workpiece and a suitable release agent in an aqueous solution with ultrasonically generated microjets to apply the release agent to the workpiece surface. One non-limiting application of the present invention is the injection of phosphoric acid agents into porous features of anodized aluminum.

Ultrasonic agitation is widely used for removing oil, scale and grime from metal and plastic parts immersed in a cleaning solution. The present invention however uses ultrasonic agitation technology in a new manner to produce non-stick films and coatings. It is theorized that ultrasonic waves create small, highly energetic bubbles. Upon implosive collapse (cavitation), these bubbles generate intense microjets, shock waves and locally high temperatures that can remove unwanted coatings/films from surfaces, small voids or recesses and penetrate trapped air pockets to remove the air therefrom. Therefore, the present invention uses ultrasonic energy in a new manner, rather than remove undesired films or coatings, the invention concerns the application of coatings onto workpieces. Although high temperatures are produced on a microscopic scale by the energy released when the bubbles collapse, the bulk solution temperature remains close to ambient.

The precise mechanism whereby ultrasonic agitation produces an anti-stick coating, such as a fluorocarbon phosphate coating onto a porous surface is not known. As shown in FIG. 4, one suggested mechanism maintains that release agents 200 are preferentially collected and transported in the air bubbles 202 created by ultrasonic agitation. As will described below in another aspect of the invention, bubbles generated by other means, such as sparging a gas through a diffuser into an aqueous solution also provides transport bubbles for the release agents. Without limitation, the gas can be air, nitrogen, oxygen, argon, $CF_4$, alkanes or any combination thereof. The amphiphilic fluorocarbon phosphonic and phosphinic acid molecules are scavenged by the air bubbles as described in a paper entitled "Surfactant Scavenging and Surface Deposition by Rising Bubbles" by Stefan and Szeri (*J. Colloid and Interface Science* 212, 1–13 (1999)). Stefan and Szeri analyzed the transport of surfactants to the ocean surface by microscopic bubbles formed by ship propellers. As shown in FIG. 4, the hydrophobic fluorocarbon (tail) portion of the molecule protrudes into the air bubble, while the hydrophilic ionic (head) portion favors the bulk liquid water. The bubbles thereby create highly concentrated aggregates of the fluorocarbon phosphonic and phosphinic acid molecules. The implosive collapse of a bubble 200 near a liquid-solid interface generates liquid microjets and shockwaves, schematically illustrated by arrows with reference numerals 204 in FIG. 5 (K. S. Suslick, "Applications of Ultrasound to Materials Chemistry," *Annu. Rev. Matl. Sci.* 29:295–326, 1999), which impact the workpiece surface 206. The high-speed jets of liquid are driven at velocities that may reach hundreds of meters per second at the solid surface. Referring now to FIG. 6, the first anionic compounds 300 to reach the surface of the workpiece 302 are chemisorbed to the surface to form a monolayer.

The high local temperatures and pressures that accompany acoustic cavitation may also accelerate the rate of reaction between the phosphate anchor group and the aluminum oxide. Surface cleaning and chemical activation may also take place during impingement by microjets and shockwaves, which sensitize the surface toward reaction with the release agent. In water, cavitation will produce reactive hydrogen peroxide ($H_2O_2$) and other highly reactive species such as hydroxyl (OH) radicals that will react with the anodized surface and provide additional bonding sites for the phosphate anchor group. As more of the anionic molecules are driven towards the surface, the molecules begin to stack in a multi-layer fashion over one another or physisorb as schematically illustrated in FIG. 7. The net effect is a dense coverage by the release agent, such as a fluorocarbon phosphate, over the metal oxide features including any highly porous subsurface regions. Chemical and mechanical interlocking of the release agent into the porous surface insures a highly durable release coating.

FIG. 8 schematically depicts the chemisorbed anionic agents and a porous feature, such as occurs on anodized aluminum surfaces after treatment with ultrasonic assisted deposition (USAD). Hydroxyl bonding sites 504 on the anodized aluminum 502 strongly bond to the phosphorus materials 506 under conditions where the pH is less than about 8. However, other suitable pH ranges may apply to different workpiece materials. When cavitation occurs near a solid-liquid interface, the implosive bubble collapses releasing a high speed jet of liquid directed towards the solid surface as discussed previously. The surface directed microjets of release agent solution produced during USAD penetrate into the voids in a porous surface. Furthermore, local turbulent flow associated with acoustic streaming enhances mass transport between the liquid and the solid surface, thereby preventing localized depletion of the fluorinated phosphonic acid. However, the release agent in solution can be replenished, if necessary. The combination of the ionic interaction with the energetic delivery of the release agent produces a durable and dense anti-stick film or coating suitable for multiple castings.

Figure 9:
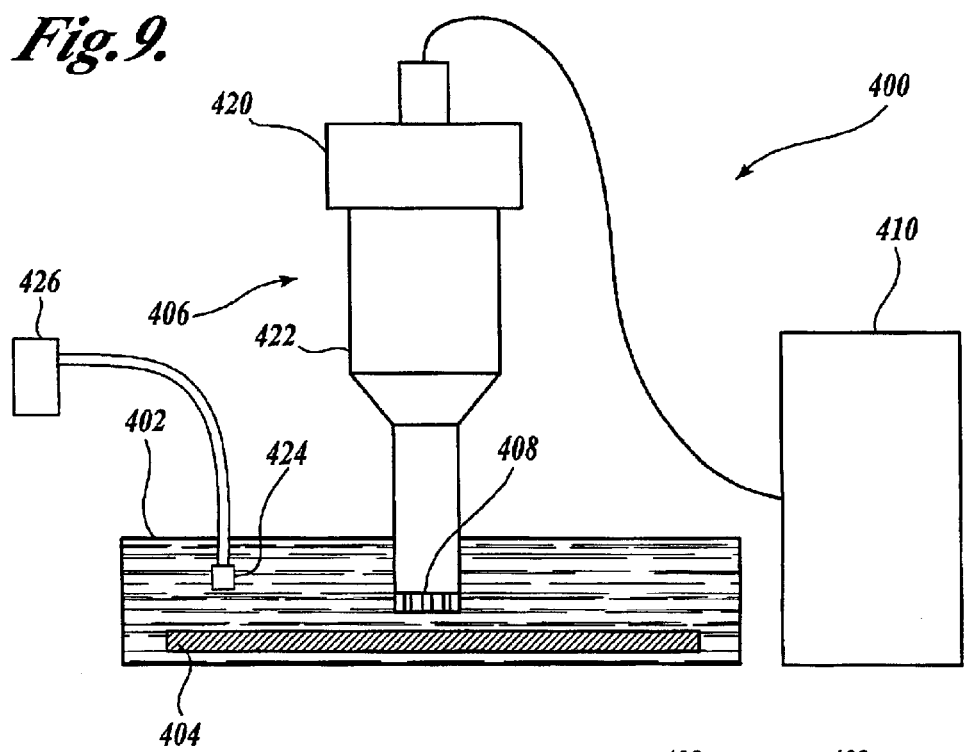
FIG. 9 shows a schematic illustration of a system for ultrasonic assisted deposition according to the present invention.

A suitable system for the application of ultrasonic assisted deposition to a workpiece according to the invention is illustrated in FIG. 9. A system 400 for depositing suitable release agents, such as a phosphonic acid or any of those described herein, onto a workpiece having a feature to be coated is schematically illustrated. The system 400 includes a tool 406 capable of providing ultrasonic energy. One such suitable tool is provided by the Misonix Company, of Farmingdale, N.Y. The tool 406 includes a power supply 410 and a sonicator tip 408 at the end of the tool 406 which is suitably immersed into a solution 402, containing any one or a combination of a suitable release agents. The water based solution may also contain adjuvants to further enhance deposition. Without limitation these adjuvants may be directed to cleaning agents (such as hydrogen peroxide, and non-reactive surfactants); pH stabilizers (such as hydrochloric acid or acetic acid, or other organic and inorganic acids); non-ionic lubricants and surface energy modifiers (such as Triton® X-100 from the Dow Chemical Company of Midland, Mich.); and anti-static components (such as Cyastat® from the Cytec Company of West Paterson, N.J.)

Figure 10:
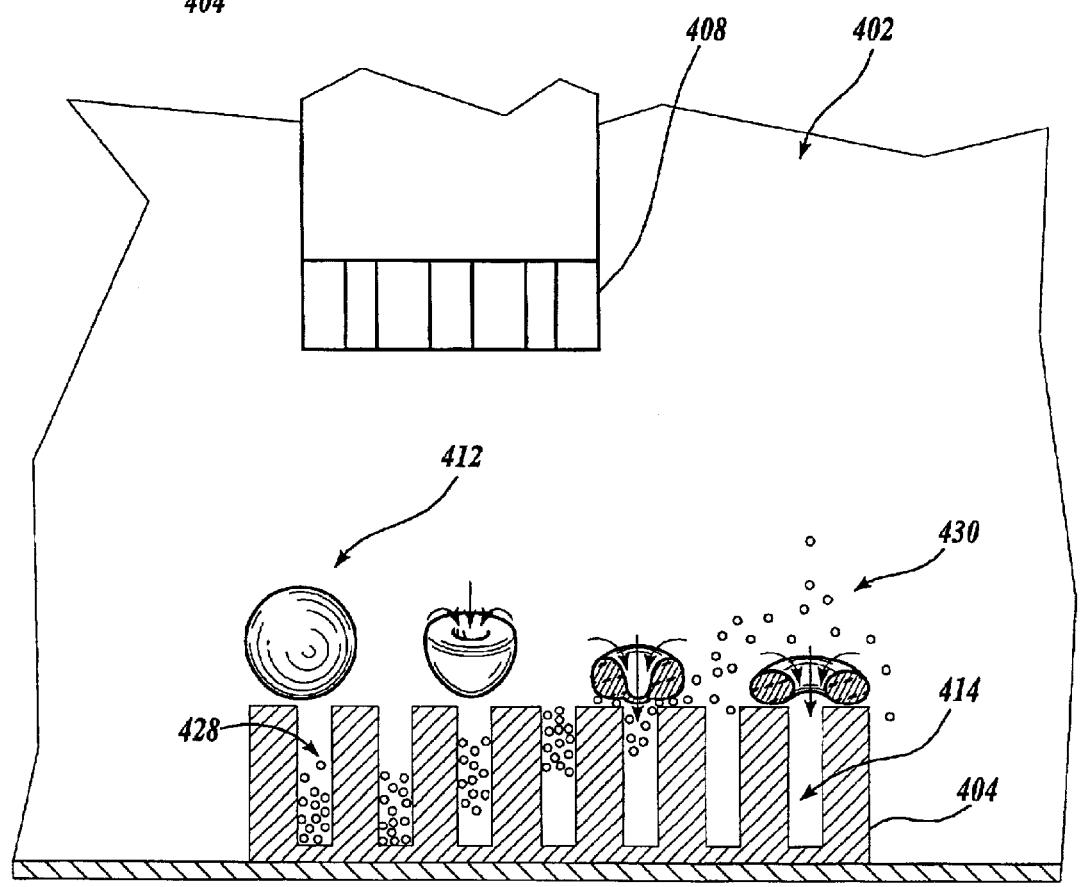
FIG. 10 shows a schematic illustration of an ultrasonic assisted deposition tool being used according to the present invention.

The container holding the solution 402 also includes a workpiece 404 immersed therein. The workpiece 404 includes a surface which is desired to be treated in order to produce a non-stick coating thereon. The workpiece surface may include porous features 404, as illustrated schematically in FIG. 10. Porous features 404 are seen to contain trapped air bubbles 428 which are expelled by the implosion of bubbles 412 created by ultrasonic action. Formerly trapped air bubbles 428 are then free to migrate throughout the solution as depicted by reference numeral 430. Nevertheless, the invention can be used on any surface regardless if it includes pores or not. Referring again to FIG. 9, one non-limiting example of the ultrasonic tool 406 is seen to include a converter 420, a horn 422, and a tip 408. The tip 408 of the tool 406 is placed in a suitable relationship to the workpiece 404, such that the sonicator tip 408 is above the workpiece 404, and such that the ultrasonic energy can be directed at the desired surface to be treated. However, it should be readily apparent that the tool 406 can be placed in other configurations to the workpiece 404, such as on its side or at an angle, depending on the particular constraints of the system or the particular workpiece surface which is to be treated. When the tip area 408 is smaller than the workpiece surface to be treated, the tool 406 may have to be rastered over the workpiece 404, meaning that the tool 406 can be mounted on a translational arm (not shown), that can move the tool 406 in a horizontal plane, or otherwise, to incrementally cover the desired surface of the workpiece 404. Alternatively, the solution 402 and workpiece 404, may be mounted on a translational table (not shown), in which case the table can be translated, such that the desired workpiece surface is exposed to the ultrasonic energy created by the tool 406. Yet another alternative is to combine the rastering motion of the tool 406 and the solution 402 with the workpiece 404. Depending on the power delivered to the tool 406, more or less passes across the workpiece can be provided. Furthermore, the speed at which the tool or table is translated can be adjusted or controlled to deliver a desired amount of energy to the workpiece for a specific time period. Power, speed, and time are intimately related, but at any power and for any length of time, the tool 406 can deliver ultrasonic energy to the workpiece 404 to realize beneficial aspects. Without limitation, the speed with which the tool or table is rastered so as to effectively treat a workpiece surface can be as high as 4 in/sec. Also, without limitation, depending on the tool selected, the sonicator tip 408 may be as close as 0.05 inches from the workpiece or as many as 6 inches from it. The distance between the tip and the workpiece can also be effected by the power of the tool. For larger scale treatment applications, multiple (two or more) sonicator tools could be mounted along the width of a conveyor that carries the workpieces to be tested. The sonicator tools could be staggered or include some small translation feature to provide ultrasonic agitation in the regions between the multiple sonicators. Another suitable sonication tool is provided by the Branson Company, which makes a line of ultrasonic tools and bath apparatus. A difference between the tools supplied by Misonix and Branson relate to where the tool is in relation to the solution. With Misonix tools, the tool is an internal tool that can be immersed in the solution; however with Branson tools, the tool is provided external to the solution.

In a further aspect of the present invention, the system 400 can include a gas introduction setup that has a gas source, a connecting line, and a diffuser. The diffuser 424 can be immersed in the aqueous solution 402. The diffuser 424 can produce bubbles that serve to transport the release agent to the workpiece surface 404. The gas source 426 can include a gas that encourages gettering, i.e., collecting of the hydrophobic tails at the surface of the liquid/gas-bubble interface as shown in FIG. 4. The gas source 426 is connected to the diffuser 424 with any suitable connector, such as rigid piping, hose or tubing. Without limitation, the gas can be air, nitrogen, oxygen, argon, $CF_4$, alkanes or any combination thereof. Furthermore, a mixer (not shown) can be provided in the solution to further enhance mass transport to the workpiece surface.

As used herein, sonication refers to the process of undergoing an ultrasonic assisted deposition treatment. Once a workpiece has undergone sonication, the workpiece can then be removed from the solution and dried. Drying can be assisted by taking the treated workpiece and placing it in any conventional temperature controlled environment, such as an oven, or alternatively drying may take place in the ambient air, outside of an oven. The treated workpieces are ready for use as molds after drying.

Ultrasonic energy is of the same physical nature as are sound waves; however, as used in the present invention, ultrasonic means having a frequency above what the average human ear can perceive. Typically, this is a frequency of about 20,000 cycles per second or greater. Suitable ultrasonic systems useful in the present invention operate at an acoustic frequency in the range of up to 1 MHz; however other systems operate at 20–150 kHz, and yet other systems at 20–40 Khz; either system is suitable for use in the present invention. Ultrasonic bath systems are available, such as the ones supplied in a range of sizes by the Branson Company of Danbury, Conn. However, for treating larger surface area workpieces, the sonicator system of FIG. 9 including a shallow pan with solution is more flexible because it requires a smaller volume of treatment liquid than a conventional ultrasonic bath, such as a Branson bath.

Any amount of ultrasonic energy applied to a desired workpiece in a solution will provide beneficial non-stick properties according to the invention. However, both the amount of time and the power level of the tool is thought to be proportional to the amount of release agent that coats on the workpiece surface. A suitable power level can be as high as several hundred watts. Also, any frequency in the ultrasonic range will provide beneficial non-stick properties according to the invention. A suitable measurement by which all applications can be judged is defined as the work density. By way of non-limiting example, by placing the tool 406 in a suitable relationship to the workpiece 408, a work density can be calculated that is proportional to the amount of work performed on the workpiece and is defined as the average of the power applied to the tool, assuming the conversion to ultrasonic energy is accomplished without any losses, for any length of time, divided by the volume separating the tip and the desired workpiece surface, and is given by the formula (1):

$$Wp = k\frac{\overline{P}}{A_{wp}}$$

Wherein, $\overline{p}$ is equal to the average power, (watts), where the typical range seen is 1 to 500 Watts;

k is a proportionality constant that is dependent upon geometry, materials, processing equipment, and processing conditions (such as frequency and bath temperature);

t is equal to the treatment time (secs.), where the typical range seen is 5 to 2000 seconds;

$A_{wp}$ is the workpiece surface area to be treated (inch$^2$), where the typical area is 0.25 in$^2$ to 100 in$_2$; and $\overline{h}$ is the average of the distance separating the tool from the surface (inches), where the typical range seen is 0.04 to 3 inches.

The equation thus provides a suitable formula that can be applied to all workpieces for any apparatus configuration. Without limitation, typical values seen for $$\frac{Wp}{k}$$

are in the range of 10 milliWatt-sec/in$^3$ to 100 MegaWatt-sec/in$^3$.

The inventors of the present invention have discovered that water soluble, anionic phosphorus fluorocarbon and hydrocarbon surfactants processed with USAD tenaciously attach to metal oxide features of a workpiece, in particular to an anodized aluminum surface, and also coat porous surfaces, thereby preventing polymer adhesion. Even liquid epoxy resins with a strong chemical affinity for hydroxyl groups on the metal oxide features do not bond to the treated surfaces. At the same time the mold release material does not leave an oily residue on either the mold or the polymer surface.

Non-limiting examples of suitable release agents are described herein as follows. Phosphorus materials with acidic hydrogen atoms attached to the phosphorus atoms via oxygen atoms are particularly useful in the mold release application. In addition, the phosphorus atom is attached to hydrocarbon or fluorocarbon chains with more than six carbon atoms. The general chemical structure of these materials is shown by:

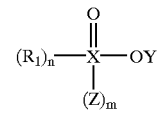

wherein Y is any element or combination of elements that forms an acid conjugate upon dissociation such as H, NH$_4$, NR$_4$ (where R is an alkyl chain such as methyl, ethyl, propyl, and butyl or an aromatic group.) or Na. Y is preferably hydrogen. X is any element that facilitates the dissociation and formation of a base conjugate with reduced chemical interaction with the polymer resin. Examples of X are P, S, and C, where P is preferred. R$_1$ is any combination of elements that provides a non-reactive barrier film suitable for providing release properties. Examples of R include alkyl, fluorinated alkyl, alkyl ester and fluorinated alkyl esters with chain lengths between 8 to 20 carbon units. The integer n is between 1 and 2, wherein n is 1 for carboxylic acid, sulfonic acid, phosphonic acid, and di-acid phosphate esters. The integer n is 2 for phosphinic acid and mono-acid phosphate esters. Alternatively, R can be alkylaryl or polyether derivatives. Z is either oxygen as with sulfonic acids or OH as with di-acid phosphate esters or phosphonic acids. Z is preferably OH. For such compounds, m is an integer equal to 1. For all other materials such as carboxylic acid, mono-acid phosphates and phosphinic acid, m is equal to 0. A suitable release compound is perfluorododecanoic acid or octylphosphonic acid or any combination thereof. Exemplary compounds useful as release agents in the present invention are sold under the trade names Zelec® MR-1 obtained from the Stepan Company of Northfield, Ill.; Zonyl® UR obtained from the DuPont Company of Wilmington, Del.; and Fluowet® PL80 obtained from the Clariant Company of Muttenz, Switzerland.

Fluorocarbon derivatives of phosphonic and phosphinic acid compounds are known to exhibit strong bonding to metal oxide surfaces. For example, Wieserman et al (U.S. Pat. No. 4,983,566), which is herein expressly incorporated by reference, treated alumina particles with these compounds for use as an adsorbent in chromatographic separation columns. The bonding of the fluorocarbon derivatives of phosphonic and phosphinic acid compounds to the alumina was sufficient to provide good chemical stability over a wide pH range.

A suitable solution for use in the present invention is prepared with an amount of a release agent or any combination of release agents that singly or combined can make up to 20% of the solution; and a matrix fluid, such as water, or alcohol/water mixture. However, the release agent can be as low as 0.05% of the solution composition. Suitable alcohols can be isopropanol, n-propanol, butanol, ethanol, methanol, etc. Contrary to conventional thinking, the present invention includes an amount of water in the solution. Water content can be a few parts per million (ppm) or it can range as high as 100% of the solution. A suitable range is 20% to 80%, or about 40% to 60%. Moisture sensitivity of silicon based mold release compounds, such as chlorosilane compounds requires the elimination of water and the use of organic solvents. Likewise, a $SiCl_4$ primer also requires organic solvents. The Si—Cl bond will hydrolyze in the presence of water leading to self-condensation of the silane compounds in solution. On the other hand, fluorocarbon phosphate materials used according to the invention do not undergo a self-condensation reaction in aqueous solutions. Aqueous based surface coating materials are also suitable based on processing safety and cost considerations.

Experience has also shown that fluorocarbon silane mold release coatings lack sufficient durability in molding of thermoset resins such as epoxy and urethanes. On the other hand, the adhesion of the fluorocarbon chains anchored to an aluminum oxide surface by a phosphate end group is superior to the partial bonding achieved by a silane functional end group. Since the phosphate end group can form a bidentate or tridentate bond with the aluminum oxide surface, most of the —OH functionality of the surface and coating is removed. In contrast, silane coatings inevitably leave uncondensed —Si—OH silanol sites at the silica (glass) or aluminum oxide surface. These silanol sites are susceptible to attachment and removal by the reactive thermoset resins. This reaction with uncapped SiOH species is detrimental to a mold release and shortens the working life of the release coating.

The release agent can be replenished as the deposition process consumes the release agent. Other adjuvants in the treatment solution may include, without limitation, any of the aforementioned adjuvants that act as cleaning agents, pH stabilizers, non-ionic lubricants and surface energy modifiers, and anti-static components.

Figure 11:
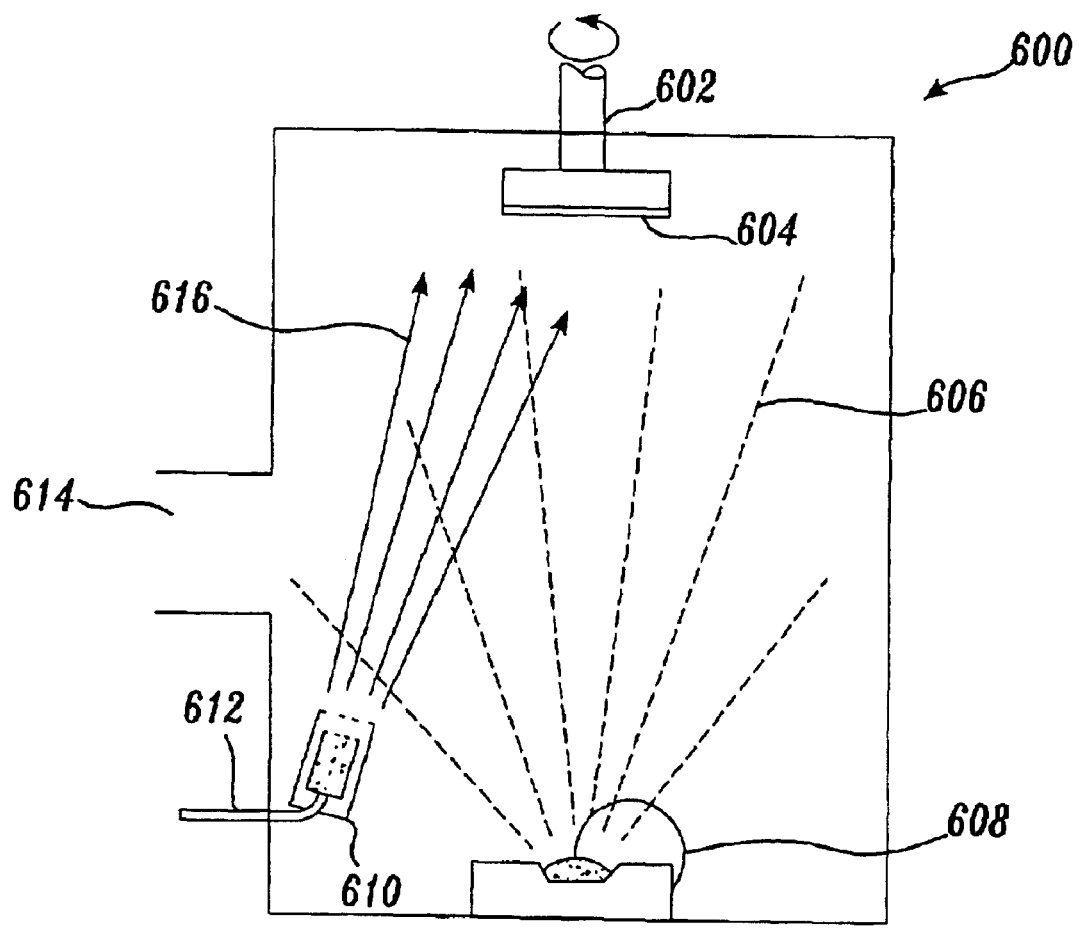
FIG. 11 shows a schematic illustration of a tool for applying a metal oxide film on a workpiece according to the present invention.

For making molded bodies, the system in the present invention suitably uses a novel mold having a metal oxide surface or any metal oxide feature desirably coated with a release agent according to the invention. The metal oxide feature can be applied by various methods as taught by the '667 application. Alternatively, as in the case of aluminum, the surface can be anodized leaving metal oxide features as a result of anodization. The present invention is equally applicable to use for non-anodized as well as anodized workpieces. The mold feature can be attached to an underlying substrate or the mold feature can be integral with the substrate. In this manner, the metal substrate can form the metal oxide coating upon exposure to air. A metal oxide coating is present at the mold surface or the entire workpiece can be of metal oxide. Alternatively, the thin metal oxide coating can be applied in any number of methods known in the thin film coating art, such as physical vapor deposition (PVD) and chemical vapor deposition (CVD), including vacuum deposition and sputter deposition as is described in the '677 application. The thin metal oxide coating can have a thickness of about 1 nm to about 10000 nm, or about 50 to about 2000 nm, and 100 to 500 nm. However, any amount of metal oxide layer is suitable in the present invention. Referring now to FIG. 11, a representative example of an apparatus for forming the thin metal coating includes a chamber 600 having a workpiece holder 602 for holding the workpiece 604 in a desired orientation while it is coated with a desired metal or metal oxide compound. The chamber 600 includes an outlet 614 to a vacuum pump to evacuate the chamber 600 of air. The chamber 600 also includes an ion gun 610 with gas inlet 612. The ion gun can be augmented or replaced by an internal heating system. The workpiece is heated to enhance the metal oxide film density and durability. An electron beam source 608 evaporates the compound 606 that is to be deposited onto the workpiece 604.

According to the present invention, suitable workpieces that function as molds include those used in cell casting and any injection molding fabrication process. Although the present invention is not limited to these technologies. In cell casting, a mold can be constructed from any number of members having one or a plurality of facing surfaces. A "face", "facing", or "inner" surface will be used to denote that side of a mold which will have contact with a suitable resin composition. The number of members is determined by the desired finished product. For example, a flat cell cast sheet would require at least two members with surfaces to shape the first and the second sides of the sheet. According to the present invention, the thermoset casting cell or injection mold is provided with a mold feature such as any surface which includes a metal oxide, or alternatively an anodized metal oxide that has undergone sonication according to the invention. As previously mentioned, the metal oxide can be deposited onto a mold feature or alternatively the mold feature can be made of a metal which forms the metal oxide on exposure to the atmosphere or an oxidizing treatment such as oxygen plasma. Once the metal oxide has been formed on the mold feature, the mold may undergo anodization or alternatively, the metal oxide is formed during anodization. In the case of aluminum, anodization produces a mold having porous features, which if left untreated would cause the resin compound to adhere to the mold. The present invention can be used to treat any porous mold to enhance its release properties. Also, the present invention can treat any irregularly shaped mold having without limitation corners, bends or edges. The present invention is suitable to use for any metal oxide feature, porous or otherwise, desired to have non-stick properties, whether it is anodized or not.

Referring now to FIGS. 12–13, a first embodiment of a mold constructed according to the present invention is illustrated. A mold 700 is constructed from a first 702 and second 706 plate member separated by a gasket 704. In the actual embodiment, the cell cast mold can include two plates of aluminum 702, 706, each member being coated at least on one facing surface with a thin metal oxide 708, 710 or anodized in any suitable fashion that is known in the art. The plate members 702 and 706 suitably undergo sonication as described above, thus providing a non-stick film on each plate members. The plate members 702, 706 are separated by a silicone rubber or other rubber-like elastomeric gasket material 704. The gasket 704 is placed in between the facing surfaces of the first mold member 702 and the second mold member 706 in a manner so as to leave an opening 720 in the mold 700. The opening 720 is used to pour the resin composition in the mold 700. The gasket 704 forms a seal on three sides between the plate members 702, 706. A spacer placed around the perimeter of the gasket (not shown) determines the thickness of the molded body. The plates 702, 706 are held together with compressive binder clips (not shown). However, any other suitable fastener can be used. Suitable articles made by cell casting include any thermoset resin article including, but not limited to illuminated switch and annunciator legends, optical filters and windows, replicated diffractive, refractive and stochastic surfaces, lenses, microlens arrays, sport and recreation laminates, such as skis or snowboards. While not intended to be an exhaustive list, the articles made using a conventional cell casting process are well known to those skill in the art. However, these same articles can be made more advantageous by using a method and mold according to the present invention.

Because the method according to the invention decreases the release force necessary to separate the mold from the molded articles, the articles made according to the invention have less surface defects than articles made by conventional methods using conventional molds. Therefore, the articles made according to the invention have enhanced surface qualities and uniformity.

Injection molding is used to form many commonly used plastic articles in mass quantities, such as automotive components including but not limited to body panels; composite components, such as overhead bins, and any number of industrially made plastic articles. While not intended to be an exhaustive list, the articles made from injection molding are well known to those skilled in the art. However, these same articles can be made more advantageous by using a method and mold according to the present invention.

Figure 14:
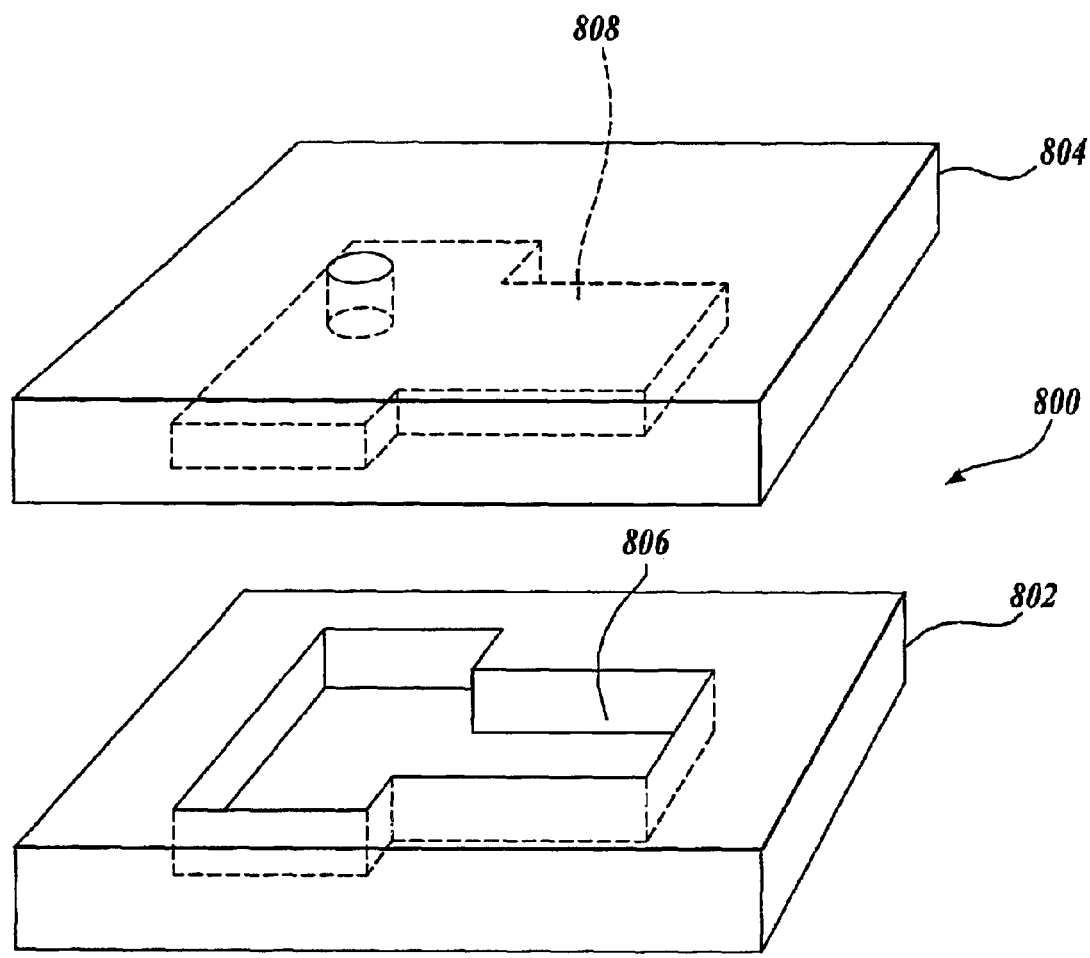
FIG. 14 shows a schematic illustration of one embodiment of an injection mold made according to the present invention.

Referring to FIG. 14, a non-limiting example of an injection mold is illustrated. The mold assembly 800 can include a first 802 and second 804 mold member. Each member has a desired feature 806, 808 resembling the negative of the final product. The features 806, 808 have a metal oxide surface that has undergone treatment by sonication to produce mold features that have a non-stick film formed thereon. Reaction injection molding ("RIM") uses thermosetting materials such as polyurethanes, to form low density flexible and rigid foams, semi rigid and self-skinning foams, to non-foamed elastomers. The reaction injection molding process is well known to those skilled in the art. However, unlike the present invention, the conventional reaction injection molding process uses a mold release agent applied in a conventional manner to prevent the mold from adhering to the molded body. The conventional release agents used in RIM include microcrystalline waxes dispersed in solvents. In addition, silicones and silicone oils are sometimes used. Problems can occur if the wax or oil is not adequately removed prior to painting. The process according to the invention treats the mold surface. A thin film metal oxide is first formed over the mold features by either surface modification methods or thin film depositions. Examples of suitable surface modification methods include anodization, oxygen plasma, UV-Ozone, or (in some cases where the substrate is metal and readily oxidized by ambient conditions) simple exposure to air. The coated metal oxide surface can then undergo sonication according to the invention to provide the mold with a suitable non-stick film. Because the method according to the invention decreases the release force necessary to separate the mold from the plastic article, the article made according to the invention has less surface defects than articles made by conventional methods using conventional molds. Therefore, the plastic articles made by using the method and mold according to the invention have enhanced surface qualities and uniformity.

A suitable metal oxide for the present invention exhibits an isoelectric point (IEP) greater than the pH of the aqueous solution containing the anionic mold release material. By possessing an IEP greater than the pH of the aqueous release containing solution, an electrostatic potential is established between the anionic release material and the ionized mold surface. The term metal oxide is intended to refer to the higher and lower valent oxides of a metal where more than one valance state exists. A suitable metal oxide coating exhibits an IEP of greater than 2. Suitably also, the metal oxide coating can exhibit an IEP of greater than or equal to about 4. For example, $TiO_2$ exhibits an IEP of about 4. While $TiO_2$ is a suitable coating, other oxides of Ti are also suitable, such as $TiO$, $Ti_2O_3$, and $Ti_3O_5$. Still suitable are metal oxide coatings that exhibit an IEP of greater than or about equal to 8. A suitable metal oxide coating exhibiting an IEP of about 8 is alumina, $Al_2O_3$. Besides alumina, the oxides $Al_2O$ and $AlO$ are also suitable. Other suitable metal oxide compounds include oxides of zirconium, such as $ZrO_2$, tantalum, $Ta_2O_5$, hafnium, $HfO_2$, yttrium $Y_2O_3$, niobium, $Nb_2O_4$ and $Nb_2O_5$, Nickel, $NiO$, magnesium, $MgO$ and $MgO_2$, iron, $Fe_2O_3$, $Fe_3O_4$, $FeOOH$, and $Fe(OH)_2$, and chromium $Cr_2O_3$, $CrO_2$, and $CrO_3$. Iron oxides have an isoelectric point in the range of about 7 to about 12.5 depending on the oxidation state, making iron oxides suitable in the present invention. Chromium oxides have an isoelectric point in the range of about 6 to about 7. NiO exhibits an IEP of about 10. MgO exhibits an IEP of about 12. The isoelectric point can be in the range of about 2 to 12. In addition, any combination of two or more of any of the aforementioned metal oxides (one non-limiting example is $Al_2O_3$—$MgO$) are also suitable materials of construction for the workpieces. While this list is not exhaustive, other metal oxides exhibiting a surface charge opposite of the release agent charge can be selected. While the IEP is not the sole determining factor in choosing a metal oxide coating, the inventors have discovered that aluminum oxide performs well, is easily deposited on a substrate, and is durable to withstand repeated cycling as well as being commercially viable. Further still, aluminum is readily anodizable, but the problems with resins adhering to the porous features have been overcome by the present invention.

A suitable mold release agent includes any mold release having an ionic character, suitably anionic, to be attracted to positively charged surfaces, but alternatively cationic when the workpiece has a relatively low IEP such that opposite charges are created between the mold surface and the release agent or the resin compounds. While the only requirement of a release agent to use in the present invention is that the release agent possesses an ionic nature, several classes of suitable compounds are provided as examples, and are not intended to be limiting. One suitable class of compounds is disclosed in U.S. Pat. No. 4,118,235 to Horiuchi et al., which is herein expressly incorporated by reference. Other release agents are the internal release agents disclosed in U.S. Pat. No. 5,962,561 to Turshani et al., which is herein expressly incorporated by reference. Any fluorinated derivative of any release agent mentioned herein is also suitable. Classes of compounds generally suited to use in the present invention include phosphates, phosphonites, sulfates, sulfites and carboxylates, such as organic phosphate esters and acids, organic phosphite esters and acids, organic sulfate esters and acids, organic sulfite esters and acids, carboxylic esters and acids, and quaternary ammonium compounds, and their fluorinated derivatives. However, this list is not intended to be exhaustive.

A suitable resin used in the present invention includes any of the resin compositions which are used in the manufacture of the aforementioned articles using casting and injection molding techniques. By way of non-limiting example, suitable resins for use in the present invention include the class of resins known as thermosets. Included within this class are polyurethanes, polyureas, epoxies and polyesters. However, this list is not intended to be limiting. Urethane resins generally consist of mixtures of bifunctional or multifunctional isocyanates and bifunctional or multifunctional polyols and polythiols. The isocyanate reacts with (for example) the polyol's hydroxyl group to form a urethane link. Polyureas are formed by the reaction of isocyanates and multi-functional amines. The isocyanates can have an aromatic or aliphatic structure. Non-limiting examples of isocyanates include isophorone diisocyanate, 1,6- hexamethylene diisocyanate, toluene diisocyanate, xylylene diisocyanate, bis(4-isocyanatocyclohexyl)methane, cyclohexane diisocyanates, and tetramethylxylylenediisocyanate. The aromatic structures are used to increase the refractive index of a resin in applications such as thin, lightweight ophthalmic lenses. Aliphatic structures are generally used to impart UV stability. The polyols can also have an aromatic or aliphatic structure. In addition, the polyols can include thiol functional reactants to increase the refractive index of a urethane cast plastic part. Examples of polyols include glycerol, ethylene glycol, propane diol, bisphenol A, trimethanol propane, polycaprolactone diols and triols, and di(2-mercaptalkyl) ether. One suitable resin composition useful in the present invention to fabricate ophthalmic lenses and optically active structures of all kinds is known by the trade name CR-39®, supplied by the PPG Company of Pittsburgh, Pa. CR-39® is also commonly called ADC for the thermosetting resin diallyl diglycol carbonate. Other resins suitable to use in the present invention are supplied by the Vantico Company of Basel, Switzerland, and Hysol OS0100 Epoxy supplied by the Henkel KgaA Company of Düsseldorf, Germany. Dyes, coloring agents, or pigments may be added to the resin composition as desired.

EXAMPLES

Introduction

In general, to test the efficacy of USAD at depositing release agents on mold workpieces, samples of alumina coated glass, machined aluminum alloys and hard anodized aluminum alloys were treated with acidic phosphorous compounds containing fluorocarbon attached to the phosphorous. However, the present invention is effective at depositing many release agents on any type of workpiece surface. In the samples tested, water and isopropanol were used as the primary solvents. Epoxy and urethane resins were used to test the release properties since these materials have strong chemical attachment to untreated anodized surfaces. Epoxy and urethane castings were produced in molds to determine the release characteristics of molds made by the present invention. The aluminum mold plates were anodized by Hytek Finishes of Kent, Wash.

Example 1

Aluminum Alloys 6061 and 7075 were anodized so as to produce a 0.002" thick alumina feature over the aluminum substrate. Alloy 6061 is comprised of 0.8–1.2% Mg, 0.4–0.8% Si, 0.15–0.40% Cu, 0.25% Cr 3 and alloy 7075 is comprised of 5.5% Zn, 2.5% Mg, 1.5% Cu, 0.3% Cr, 0.2% Mn A solution was prepared having 0.4% by weight Zonyl UR (an anionic phosphate fluorosurfactant produced by DuPont) dissolved in a 60/40 DI water/isopropanol. The solution was added to a benchtop Branson ultrasonic bath (Model No. 2510).

The fluorinated phosphate ester was deposited on the anodized aluminum with the aid of sonication using the Branson ultrasonic bath at 45° C. solution temperature and for a relatively long treatment time of up to 30 minutes. Following this treatment, water drops demonstrated a 110° contact angle, which indicates that a low surface energy coating was deposited.

As a control, untreated plates were treated only in room temperature water. The casting made between the water-treated anodized aluminum plates are comparative examples and are meant for the purpose of generating control castings.

All of the plates were heated to 85 C for 30 minutes immediately following the treatment to remove traces of water from the surface and the molds were assembled according to FIGS. 12 and 13.

The resin was prepared in the following manner: Part A and part B of Hysol OS0100 Epoxy was mixed in a 1:1 ratio at room temperature. The clear solution was poured in each of the test molds and cured at 100° C. for 2 hours followed by 130° C. for 4 hours.

Following the cure cycle, the molds were cooled to room temperature and opened. The release properties are summarized in Table 1 below.

As shown in Table 1, all of the plates treated in an ultrasonic bath released very well. Following the first casting in ultrasonically treated mold plates, water drops still demonstrated greater than 100° contact angles. Subsequent castings were made on the same mold surface without mold release retreatment. All subsequent castings showed comparable release properties.

TABLE 1

Mold Release Results

| | Ultrasonic Treatment in Mold Release Solution, 45° C. - 30 min | Soaked in Water |
|---|---|---|
| 6061 Anodized | Excellent | Poor (delaminated) |
| 7075 Anodized | Excellent | Poor (delaminated) |

Ten consecutive castings were produced using a single USAD treatment on 7075 anodized aluminum plate. All ten castings demonstrated excellent release properties. Following the eighth casting, the water contact angle was still greater than 100 degrees.

Example 2

Tooling Aluminum plates were milled to form casting cell molds. These plates were then anodized so as to produce a 0.001" thick porous alumina structure over the aluminum substrate.

The phosphonic acid solution as described in Example 1 was poured into a shallow plastic container.

The mold plate was placed in the phosphonic acid solution and treated with a Misonix Sonicator Ultrasonic Processor XL-2020, 20 kHz equipment used in the USAD process as illustrated in FIG. 9. The anodized aluminum plate was translated beneath the stationary horn equipped with a ½ inch tip at a rate of approximately 0.25 inches/second. The water-alcohol bath was moved in a linear fashion along one edge of the anodized aluminum plate. Upon reaching the edge of the aluminum, the translation stage moved the bath ½ inch and the horn then passed over an untreated path adjacent to the first path. This stepping pattern was repeated until the desired workpiece surface was completely exposed to the sonication produced by the ultrasonic horn. The ultrasonic power delivered to the water-alcohol solution beneath the horn was approximately 100 Watts.

All of the plates were heated to 85 C for 30 minutes immediately following the mold release solution treatment and the molds were assembled according to FIGS. 12 and 13. Following drying, the water contact angle was greater than 110 degrees.

The resin was prepared in the following manner: Part A and part B of Hysol OS0100 Epoxy was mixed in a 1:1 ratio at room temperature. The clear mixture was poured in each of the test molds and cured at 100° C. for 2 hours followed by 130° C. for 4 hours.

Following the cure cycle, the molds were cooled to room temperature and opened. All of the treated mold surfaces demonstrated excellent release properties. Following the first set of castings, the water contact angle was greater than 100 degrees. Thirty-eight subsequent castings were made on the once treated molds. All 38 castings demonstrated easy release properties.

Example 3

Tooling Aluminum plates were milled to form 0.030" casting cell molds. Unlike the molds described in Example 2, the molds described below where not anodized. The finish of the molds were unpolished, machined surfaces with pores associated with mill marks and machining defects.

The phosphonic acid solution as described in Example 1 was poured into a shallow plastic container.

The mold plates were placed in the phosphonic acid solution and treated with a Misonix 20 kHz equipment used in the USAD process as described in Example 2.

All of the mold plates were heated to 85 C for 30 minutes immediately following the mold release solution treatment and the molds were assembled according to FIGS. 12 and 13. Following drying, the water contact angle was greater than 110 degrees.

The resin was prepared in the same manner as described in Example 2

Following the cure cycle, the molds were cooled to room temperature and opened. All of the treated mold surfaces demonstrate excellent release properties. Following the first set of castings, the water contact angle was greater than 100 degrees. 20 subsequent castings were made on the once treated molds. All 20 castings demonstrated easy release properties.

Example 4

Apply 0.5 microns of $Al_2O_3$ film to a 2"×2" heated float glass substrate by PVD (Physical Vapor Deposition). The mold plates were placed in a 1% Zonyl UR aqueous solution and treated with a Misonix 20 kHz equipment used in the USAD process as illustrated in FIG. 9 and similar to EXAMPLE 2. However, unlike EXAMPLE 2, the substrate remained stationary and was not translated under the horn tip. Following sonication, visible interference rings developed on the treated substrate in a pattern concentric around the ultrasonic tip location.

Figure 15:
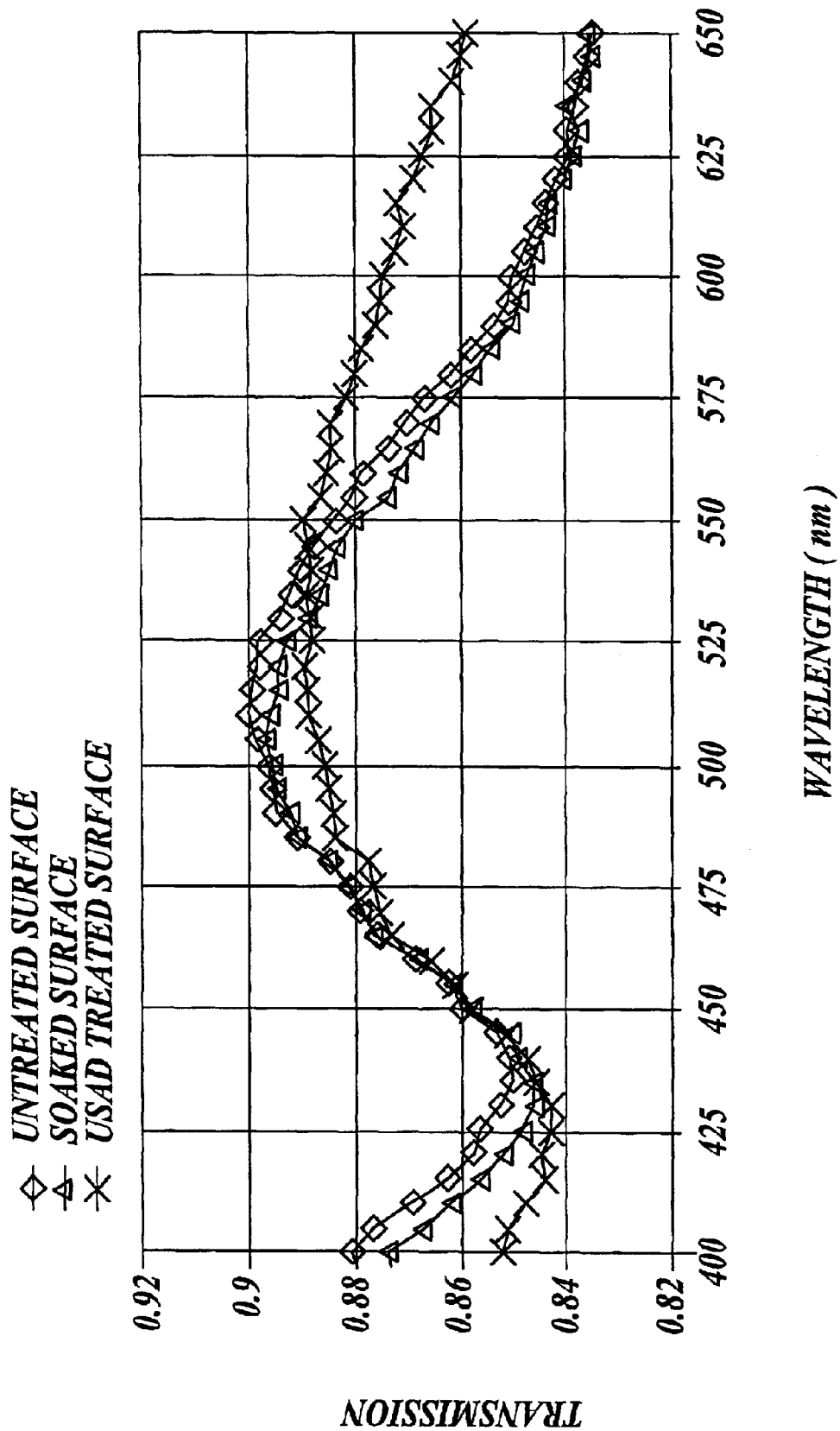
FIG. 15 shows a graphical illustration of transmission spectra of workpieces treated according to the present invention.

The interference patterns indicate that the Zonyl UR coating is significantly thicker than a monolayer. FIG. 15 shows the transmission spectra of the alumina coated glass untreated, treated by simple soaking techniques, and treated by USAD methods. The transmission spectra of the USAD treated glass is measurably different than the untreated glass again indicating a film thickness greater than about 100 nm. This type of thick film structure is illustrated schematically in FIG. 7. In contrast, the soaked alumina coated glass shows a spectrum very similar to the untreated alumina coated glass.

The USAD treated mold plates were heated to 85 C for 30 minutes immediately following the mold release solution treatment and the molds were assembled according to FIGS. 12 and 13. Following drying, the water contact angle was greater than 110 degrees.

Charge a flask with 22.2 g of isophorone diisocyanate (IPDI), and 20 g of polycaprolactone triol (average MW=300 g/mol). Mix and heat the mixture to 60° C. until obtaining a homogenous/clear solution. Pour the clear solution in the test mold and cure at 160° C. for 4 hours Following the cure cycle, the molds were cooled to room temperature and opened. The USAD treated mold surfaces demonstrate excellent release properties. Following the first set of castings, the water contact angle was greater than 100 degrees. Five subsequent castings were made on the once treated molds. All five castings demonstrated easy release properties.

Example 5

Apply 0.5 microns of $Al_2O_3$ film to a 2"×2" heated float glass substrate by PVD (Physical Vapor Deposition). The mold plates were treated in a manner described in EXAMPLE 4.

The USAD treated mold plates were heated to 85 C for 30 minutes immediately following the mold release solution treatment and the molds were assembled according to FIGS. 12 and 13. Following drying, the water contact angle was greater than 110 degrees.

The Hysol OS0100 epoxy resin was prepared in the same manner as described in Example 2

Following the cure cycle, the molds were cooled to room temperature and opened. All of the treated mold surfaces demonstrated excellent release properties. Following the first set of castings, the water contact angle was greater than 100 degrees. Five subsequent castings were made on the once treated molds. All five castings demonstrated easy release properties.

Other mold release methods, for example internal mold release (IMRs) additives, cannot provide adequate protection for highly porous surfaces. Compative Examples 6 and 7 demonstrate that while IMR agents work satisfactorily with low-porosity $Al_2O_3$ coated glass molds, IMRs fail to protect an anodized (highly porous) mold surface.

Comparative Example 6

Tooling Aluminum plates were milled to form casting cell molds. These plates were then anodized so as to produce a 0.001" thick porous alumina structure over the aluminum substrate.

Charge a flask with 22.23 g of isophorone diisocyanate (IPDI), 8.0 g of polycaprolactone triol (average MW=300 g/mol), 5.364 g of trimethanol propane and 0.2 g of ZELEC MR-1. Mix and heat the mixture to 60° C. until obtaining a homogeneous/clear solution. Cast the clear solution into the mold as prepared according to FIGS. 12 and 13 and cure the resin at 160° C. for 4 hours.

Following the cure cycle, the molds were cooled to room temperature and opened. The anodization from the mold surfaces delaminated from the aluminum substrate upon opening the mold.

Comparative Example 7

Apply 0.5 microns of $Al_2O_3$ film to a heated float glass substrate by PVD. Assemble the test mold as shown in FIGS. 12 and 13. The alumina coated glass substrate is the treated mold surface 612 shown in FIGS. 12 and 13.

Charge a flask with 22.23 g of isophorone diisocyanate (IPDI), 8.0 g of polycaprolactone triol (average MW=300 g/mol), 5.364 g of trimethanol propane and 0.2 g of ZELEC MR-1. Mix and heat the mixture to 60° C. until obtaining a homogenous/clear solution. Cast the clear solution into the prepared mold and cure the resin at 160° C. for 4 hours.

The resulting casting released from the alumina coated glass substrates.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A method for depositing a release agent on a surface of a workpiece, comprising steps for:
providing a workpiece having a desired feature to be coated with a suitable release agent;
providing a solution comprising the release agent and water, wherein the workpiece can be placed within said solution; and
providing ultrasonic energy to the solution, said workpiece being exposed to said energy at a suitable power level and for a suitable time to provide the feature with a film containing the release agent.

2. The method of claim 1, wherein the workpiece feature comprises a metal oxide.

3. The method of claim 2, wherein the metal oxide is selected from the group consisting of $TiO_2$, $TiO$, $Ti_2O_3$, $Ti_3O_5$, $SnO$, $SnO_2$, $Al_2O_3$, $Al_2O$, $AlO$, $Ta_2O_5$, $ZrO_2$, $HfO_2$, $Y_2O_3$, $Nb_2O_4$, $Nb_2O_5$, $NiO$, $MgO$, $MgO_2$, $Fe_2O_3$, $Fe_3O_4$, $FeOOH$, $Fe(OH)_2$, $Cr_2O_3$, $CrO_2$, and $CrO_3$, or any combination thereof.

4. The method of claim 3, wherein the metal oxide is $Al_2$.

5. The method of claim 3, wherein the metal oxide is $NiO$.

6. The method of claim 3, wherein the metal oxide is $MgO$.

7. The method of claim 3, wherein the metal oxide is $SnO_2$.

8. The method of claim 1, wherein the workpiece comprises aluminum.

9. The method claim 8, wherein the workpiece comprises once-anodized aluminum.

10. The method of claim 1, wherein the workpiece comprises a metal oxide coating.

11. The method of claim 10, wherein the coating exhibits an isoelectric point greater than about 2.

12. The method of claim 10, wherein the metal oxide exhibits an isoelectric point greater than or about equal to 4.

13. The method of claim 10, wherein the metal oxide exhibits an isoelectric point greater than or about equal to 8.

14. The method of claim 10, wherein the metal oxide exhibits an isoelectric point greater than or about equal to 10.

15. The method of claim 10, wherein the metal oxide exhibits an isoelectric point less than or about equal to 12.

16. The method of claim 10, wherein the metal oxide exhibits an isoelectric point from about 7 to about 12.5.

17. The method of claim 16, wherein the metal oxide is selected from the group consisting of $Fe_2O_3$, $Fe_3O_4$, $FeOOH$, and $Fe(OH)_2$, or any combination thereof.

18. The method of claim 10, wherein the metal oxide exhibits an isoelectric point from about 6 to about 7.

19. The method of claim 18, wherein the metal oxide is selected from the group consisting of $CrO_3$, $CrO_2$, and $Cr_2O_3$, or any combination thereof.

20. The method of claim 1, wherein the solution comprises water, alcohol and a release agent.

21. The method of claim 20, wherein the release agent comprises up to 1% of the solution.

22. The method of claim 1, wherein the release agent is an anionic compound.

23. The method of claim 1, wherein the release agent comprises fluorine.

24. The method of claim 1, wherein the release agent is a compound with the following general formula:

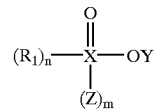

wherein,
Y is any element or combination of elements that forms an acid conjugate upon dissociation,
X is any element that facilitates the dissociation and formation of a base conjugate with reduced chemical interaction with the resin mixture,
$R_1$ is any combination of elements that provides a non-reactive barrier film on the workpiece surface,
n is either 1 or 2,
Z is either O or OH,
m is either 0 or 1.

25. The method of claim 24, wherein,
Y is H, $NH_4$, or $NR_4$, wherein R is any aliphatic hydrocarbon chain,
X is P, S, or C,
$R_1$ is any alkyl, alkyl ester, or fluorinated alkyl esters, $R_1$ having from 8 to 20 carbon units,
n is 1 when X is C or S or when X is P and the compound describes phosphonic acid or di-acid phosphate esters,
n is 2 when X is P and the compound describes phosphinic acid or mono-acid phosphate esters,
Z is O when X is S and the compound describes sulfonic acids, Z is OH when X is P and the compound describes di-acid phosphate esters or phosphonic acids, and m is 1,
m is 0 when X is C or X is P and the compound describes mono-acid phosphates or phosphinic acid.

26. The method of claim 1, wherein the release agent is an ester or acid selected from the group consisting of phosphates, phosphonates, phosphonites, sulfates, sulfites and carboxylates.

27. The method of claim 1, wherein the frequency of ultrasonic energy is up to about 40 kHz.

28. The method of claim 1, wherein the source of ultrasonic energy is provided either internally or externally to the solution.

29. The method of claim 1, wherein the source of ultrasonic energy is rastered over the workpiece.

30. The method of claim 1, further comprising a step for drying the workpiece, comprising subjecting the workpiece to a temperature of about 80 to about 120 degrees centigrade for a time period up to about 4 hours.

31. The method of claim 1, further comprising a step for: providing a transport gas into the solution.

32. The method of claim 31, wherein the gas is selected from the group consisting of air, nitrogen, oxygen, argon, $CF_4$, alkanes or any combination thereof.

33. A method for depositing a release agent on a surface of a workpiece, comprising placing the workpiece in an aqueous solution containing a release agent and applying ultrasonic energy to generate bubbles in the solution to transport the release agent to the surface of the workpiece to coat the release agent to the workpiece surface.

34. The method of claim 33, wherein the workpiece comprises a metal oxide surface.

35. The method of claim 34, wherein the metal oxide is selected from the group consisting of $TiO_2$, $TiO$, $Ti_2O_3$, $Ti_3O_5$, $SnO$, $SnO_2$, $Al_2O_3$, $Al_2O$, $AlO$, $Ta_2O_5$, $ZrO_2$, $HfO_2$, $Y_2O_3$, $Nb_2O_4$, $Nb_2O_5$, NiO, MgO, $MgO_2$, $Fe_2O_3$, $Fe_3O_4$, FeOOH, $Fe(OH)_2$, $Cr_2O_3$, $CrO_2$, and $CrO_3$, or any combination thereof.

36. The method of claim 35, wherein the metal oxide is $Al_2O_3$.

37. The method of claim 35, wherein the metal oxide is NiO.

38. The method of claim 35, wherein the metal oxide is MgO.

39. The method of claim 35, wherein the metal oxide is $SnO_2$.

40. The method of claim 33, wherein the workpiece comprises aluminum.

41. The method claim 40, wherein the workpiece comprises once-anodized aluminum.

42. The method of claim 33, wherein the workpiece comprises a metal oxide coating.

43. The method of claim 42, wherein the coating exhibits an isoelectric point greater than about 2.

44. The method of claim 42, wherein the metal oxide exhibits an isoelectric point greater than or about equal to 4.

45. The method of claim 42, wherein the metal oxide exhibits an isoelectric point greater than or about equal to 8.

46. The method of claim 42, wherein the metal oxide exhibits an isoelectric point greater than or about equal to 10.

47. The method of claim 42, wherein the metal oxide exhibits an isoelectric point less than or about equal to 12.

48. The method of claim 42, wherein the metal oxide exhibits an isoelectric point from about 7 to about 12.5.

49. The method of claim 48, wherein the metal oxide is selected from the group consisting of $Fe_2O_3$, $Fe_3O_4$, FeOOH, and $Fe(OH)_2$, or any combination thereof.

50. The method of claim 42, wherein the metal oxide exhibits an isoelectric point from about 6 to about 7.

51. The method of claim 50, wherein the metal oxide is selected from the group consisting of $CrO_3$, $CrO_2$, and $Cr_2O_3$, or any combination thereof.

52. The method of claim 33, wherein the solution comprises water, alcohol and a release agent.

53. The method of claim 52, wherein the release agent comprises up to 1% of the solution.

54. The method of claim 33, wherein the release agent is an anionic compound.

55. The method of claim 33, wherein the release agent comprises fluorine.

56. The method of claim 33, wherein the release agent is a compound with the following general formula:

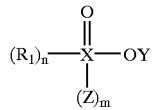

wherein,

Y is any element or combination of elements that forms an acid conjugate upon dissociation, X is any element that facilitates the dissociation and formation of a base conjugate with reduced chemical interaction with the resin mixture, $R_1$ is any combination of elements that provides a non-reactive barrier film on the workpiece surface, n is either 1 or 2, Z is either O or OH, m is either 0 or 1.

57. The method of claim 56, wherein,

Y is H, $NH_4$, or $NR_4$, wherein R is any aliphatic hydrocarbon chain,

X is P, S, or C, $R_1$ is any alkyl, alkyl ester, or fluorinated alkyl esters, $R_1$ having from 8 to 20 carbon units, n is 1 when X is C or S or when X is P and the compound describes phosphonic acid or di-acid phosphate esters, n is 2 when X is P and the compound describes phosphinic acid or mono-acid phosphate esters, Z is O when X is S and the compound describes sulfonic acids, Z is OH when X is P and the compound describes di-acid phosphate esters or phosphonic acids, and m is 1, m is 0 when X is C or X is P and the compound describes mono-acid phosphates or phosphinic acid.

58. The method of claim 33, wherein the release agent is an ester or acid selected from the group consisting of phosphates, phosphonates, phosphonites, sulfates, sulfites and carboxylates.

59. The method of claim 33, wherein the frequency of ultrasonic energy is up to about 40 kHz.

60. The method of claim 33, wherein the source of ultrasonic energy is provided either internally or externally to the solution.

61. The method of claim 33, wherein the source of ultrasonic energy is rastered over the workpiece.

62. The method of claim 33, further comprising subjecting the workpiece to a temperature of about 80 to about 120 degrees centigrade for a time period up to about 4 hours.

63. The method of claim 33, further comprising providing a transport gas into the solution.

64. The method of claim 31, wherein the gas is selected from the group consisting of air, nitrogen, oxygen, argon, $CF_4$, alkanes or any combination thereof.

65. A method for depositing a release agent on a surface of a workpiece, comprising:

providing a workpiece having a feature desired to be coated with a release agent;

providing a solution comprising the release agent and water, wherein the workpiece is placed within said solution; and providing cavitation energy to the solution, said workpiece being exposed to said energy to coat the feature with a film containing the release agent.

66. The method of claim 65, wherein said cavitation energy is ultrasonic energy.

* * * * *

UNITED STATES PATENT AND TRADEMARK OFFICE
CERTIFICATE OF CORRECTION

PATENT NO. : 6,852,266 B2
DATED : February 8, 2005
INVENTOR(S) : T.R. Robinson et al.

It is certified that error appears in the above-identified patent and that said Letters Patent is hereby corrected as shown below:

Column 21,
Line 25, "Al$_2$." should read -- Al$_2$O$_3$. --

Column 22,
Line 24, "alkyl esters," should read -- alkyl ester, --
Line 56, "CF$_4$, alkanes" should read -- CF$_4$, and alkanes --

Column 24,
Line 12, "alkyl esters," should read -- alkyl ester, --
Line 44, "CF$_4$, alkanes" should read -- CF$_4$, and alkanes --

Signed and Sealed this

Twenty-eighth Day of June, 2005

JON W. DUDAS
*Director of the United States Patent and Trademark Office*